(12) United States Patent
Han

(10) Patent No.: US 11,061,437 B2
(45) Date of Patent: Jul. 13, 2021

(54) FOLDABLE DISPLAY DEVICE

(71) Applicant: SAMSUNG DISPLAY CO., LTD., Yongin-si (KR)

(72) Inventor: Jeong Won Han, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 122 days.

(21) Appl. No.: 16/570,467

(22) Filed: Sep. 13, 2019

(65) Prior Publication Data

US 2020/0257334 A1 Aug. 13, 2020

(30) Foreign Application Priority Data

Feb. 7, 2019 (KR) ........................ 10-2019-0014614

(51) Int. Cl.
*G06F 1/16* (2006.01)
*G06F 3/041* (2006.01)
*H04M 1/02* (2006.01)

(52) U.S. Cl.
CPC .......... *G06F 1/1641* (2013.01); *G06F 1/1652* (2013.01); *G06F 3/041* (2013.01); *H04M 1/022* (2013.01); *H04M 1/0268* (2013.01); *G06F 1/1681* (2013.01)

(58) Field of Classification Search
CPC ...... G06F 1/1641; G06F 1/1652; G06F 3/041; H04M 1/022; H04M 1/0268
See application file for complete search history.

(56) References Cited

U.S. PATENT DOCUMENTS

| 9,250,733 | B2 | 2/2016 | Lee et al. |
| 9,348,369 | B2 | 5/2016 | Kee et al. |
| 9,983,722 | B2 | 5/2018 | Yi et al. |
| 2009/0264156 | A1 | 10/2009 | Burghardt et al. |
| 2015/0227271 | A1* | 8/2015 | Kang ............. G06F 1/1677 715/781 |
| 2015/0227286 | A1* | 8/2015 | Kang ............. G06F 3/04886 715/781 |

(Continued)

FOREIGN PATENT DOCUMENTS

| CN | 106790820 A | 5/2017 |
| KR | 100850336 B1 | 7/2008 |

(Continued)

OTHER PUBLICATIONS

Min Su, Kim, Did Samsung show the future of foldable phones?, Article, Nov. 9, 2018, 5 pages, Retrieved from http://www.nocutnews.co.kr/news/5058342.

(Continued)

*Primary Examiner* — Nidhi Thaker
(74) *Attorney, Agent, or Firm* — Cantor Colburn LLP

(57) ABSTRACT

A foldable display device may include: a support structure including a hinge, a plurality of supports disposed on opposite sides of the hinge and coupled to the hinge, where a light transmitting area is defined in a portion of the supports; a foldable display panel disposed on a first surface of the support structure, and including a foldable display area corresponding to the hinge, and a plurality of display areas disposed on opposite sides of the foldable display area; and a first input sensor disposed in the light transmitting area of the support structure at a position spaced apart from the foldable display panel.

18 Claims, 14 Drawing Sheets

(56) References Cited

U.S. PATENT DOCUMENTS

| 2015/0378557 | A1* | 12/2015 | Jeong | G06F 3/0484 |
| | | | | 715/835 |
| 2016/0291642 | A1* | 10/2016 | Kwak | G06F 1/1626 |
| 2017/0069299 | A1* | 3/2017 | Kwak | G06F 3/147 |
| 2017/0192572 | A1* | 7/2017 | Han | G06F 3/04164 |
| 2018/0329530 | A1 | 11/2018 | Yu et al. | |
| 2019/0306290 | A1* | 10/2019 | Lee | H04M 1/0214 |

FOREIGN PATENT DOCUMENTS

| KR | 1020140142004 A | 12/2014 |
| KR | 101875855 B1 | 7/2018 |
| KR | 1020180097225 A | 8/2018 |
| WO | 2017111204 A1 | 6/2017 |

OTHER PUBLICATIONS

Macguyver, Samsung is coming out with a foldable smartphone next January; is it Rumor or True?, Article, Sep. 18, 2015, 10 pages, retreived from https://post.naver.com/viewer/postView.nhn?volumeNo=2431926&memberNo=5931703.

Extended European Search Report for Application No. 20152567.2 dated Jun. 15, 2020.

\* cited by examiner

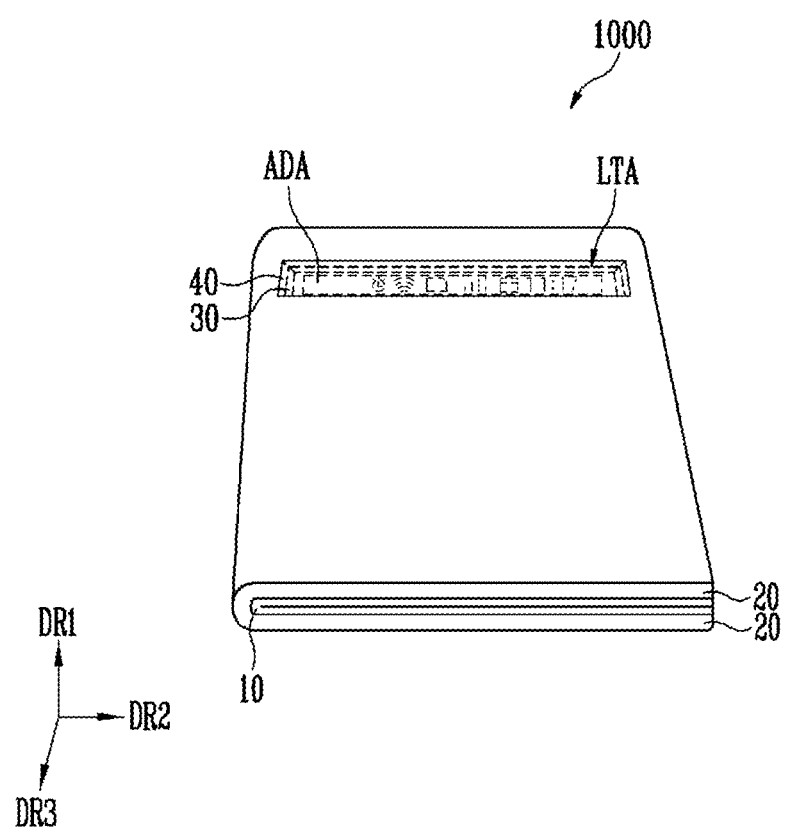

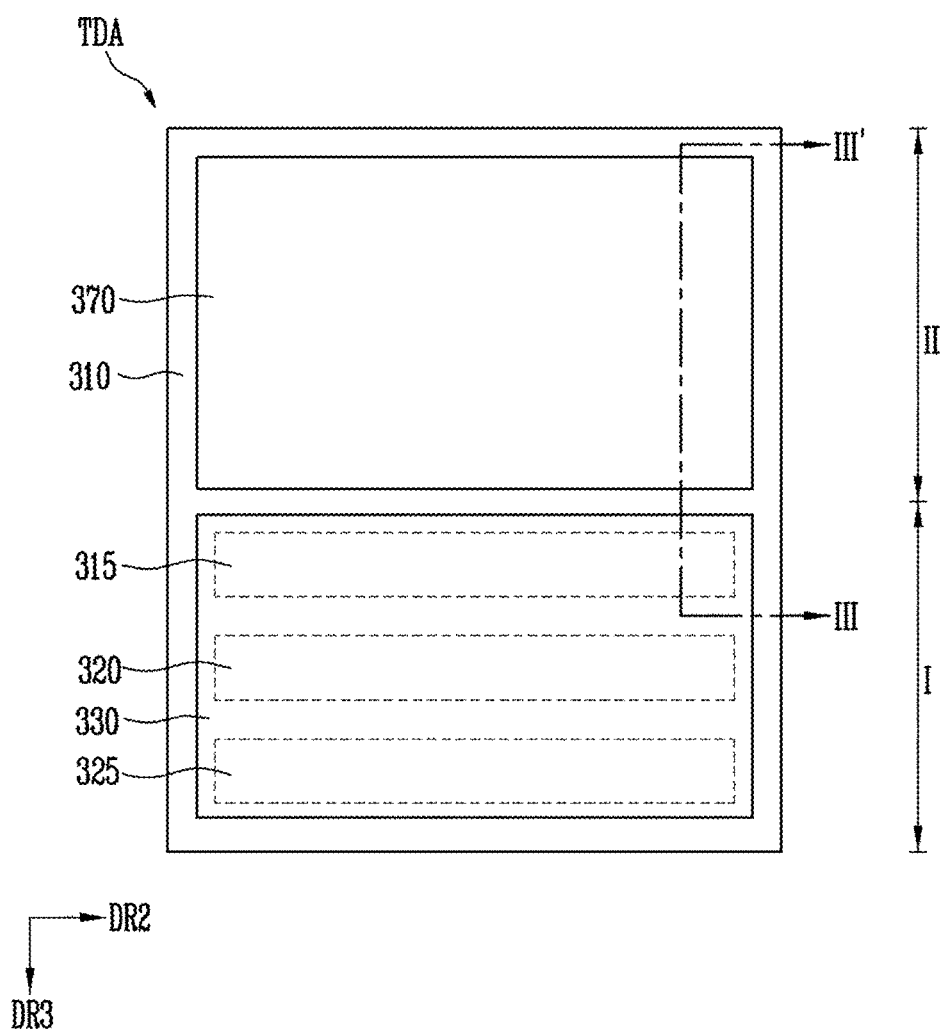

FOLDABLE DISPLAY DEVICE

This application claims priority to Korean patent application number 10-2019-0014614 filed on Feb. 7, 2019, and all the benefits accruing therefrom under 35 U.S.C. § 119, the content of which in its entirety is herein incorporated by reference.

BACKGROUND

1. Field

Embodiments of the disclosure relate to an electronic apparatus, and more particularly, to a foldable display device and an electronic apparatus including the foldable display device.

2. Description of Related Art

Recently, research on a foldable display device, a bendable display device, a rollable display device, etc. including a flexible display panel which is bendable or foldable has been conducted. Such display devices may be applied to various fields, e.g., not only a portable electronic device and a wearable device, but also a television, a monitor, etc.

Foldable display devices may be classified into an in-folding type in which a display device is folded in a way such that display surfaces thereof face each other, and an out-folding type in which a display device is folded in a way such that display surfaces thereof are oriented outwards.

SUMMARY

When an in-folding type foldable display device is completely folded, it is difficult to check displayed information or manipulate a display.

To allow a user to check displayed information when the in-folding type foldable display device is in a folded state, there is a need for an additional display panel to be disposed on a surface of a support structure opposite to a display panel provided on the support structure.

Embodiments of the disclosure are directed to a foldable display device which allows a user to check displayed information and to input a command through a light transmitting area of a support structure when a foldable display panel is in a folded state.

An embodiment of the disclosure provides a foldable display device including: a support structure including a hinge, a plurality of supports disposed on opposite sides of the hinge and coupled to the hinge, where a light transmitting area is defined in a portion of the supports; a foldable display panel disposed on a first surface of the support structure, and including a foldable display area corresponding to the hinge, and a plurality of display areas disposed on opposite sides of the foldable display area; and a first input sensor disposed in the light transmitting area of the support structure at a position spaced apart from the foldable display panel.

In an embodiment, the light transmitting area may correspond to an opening defined in the support structure, and a transparent insulating layer may be disposed in the opening of the support structure.

In an embodiment, the first input sensor may be disposed on the transparent insulating layer, and the transparent insulating layer may be disposed between the first input sensor and the foldable display panel when the foldable display panel is folded.

In an embodiment, when the foldable display panel is unfolded, the foldable display panel may not overlap the light transmitting area.

In an embodiment, when the foldable display panel is folded, a portion of the display areas of the foldable display panel may overlap the light transmitting area.

In an embodiment, the foldable display device may further include a transparent protective layer disposed to cover the first input sensor.

In an embodiment, at least a portion of a sidewall of the opening of the support structure may include an inclined surface which is inclined with respect to a first direction perpendicular both to the first surface of the support structure and to a second surface of the support structure facing the first surface.

In an embodiment, a first width of the opening, which is defined on a plane in an extension of the first surface of the support structure, may be greater than a second width of the opening, which is defined on a plane in an extension of the second surface of the support structure.

In an embodiment, the first input sensor may include at least one of a touch sensor and a pressure sensor, each of which includes a transparent conductive pattern.

In an embodiment, when the foldable display panel is folded with an angle less than a predetermined reference angle, the first input sensor may be activated. In such an embodiment, when the foldable display panel is unfolded with an angle greater than or equal to the reference angle, the first input sensor may be inactivated.

In an embodiment, the support structure may be disposed opposite to a display surface of the foldable display panel, and the foldable display panel may further include a second input sensor disposed on the display surface.

In an embodiment, the light transmitting area may correspond to an opening of the support structure. In such an embodiment, the support structure may further include an electrochromic window disposed in the light transmitting area, and the transparency of the electrochromic window may vary based on an amount of current applied to the electrochromic window.

In an embodiment, the electrochromic window may include: a first transparent insulating layer disposed on a plane in an extension of the first surface of the support structure; a first transparent electrode layer disposed on the first transparent insulating layer; a polymer dispersed liquid crystal ("PDLC") disposed on the first transparent electrode layer; a second transparent electrode layer disposed on the PDLC; and a second transparent insulating layer disposed on the second transparent electrode layer.

In an embodiment, the first input sensor may be disposed on the second transparent insulating layer.

In an embodiment, the first input sensor may include at least one of a touch sensor and a pressure sensor each of which includes a transparent conductive pattern.

In an embodiment, the foldable display panel may further include a transparent display area including a plurality of pixels, and the pixels of the transparent display area may overlap the electrochromic window.

In an embodiment, when the foldable display panel is folded with an angle less than a predetermined reference angle, the electrochromic window may be changed to be transparent. In such an embodiment, when the foldable display panel is unfolded with an angle greater than or equal to the reference angle, the electrochromic window may be changed to be opaque.

An embodiment of the disclosure provides a foldable display device including: a support structure including a hinge, a plurality of supports disposed on opposite sides of the hinge and coupled to the hinge, where an opening is defined in a portion of the supports; a transparent insulating layer disposed in the opening of the support structure; a foldable display panel disposed on a first surface of the support structure, and including a foldable display area corresponding to the hinge, and a plurality of display areas disposed on opposite sides of the foldable display area; and a transparent conductive pattern disposed on a first surface of the transparent insulating layer, which is adjacent to a second surface of the support structure opposite to the first surface of the support structure.

In an embodiment, when the foldable display panel is unfolded, the foldable display panel may not overlap the opening. In such an embodiment, when the foldable display panel is folded, a portion of the display areas of the foldable display panel may overlap the opening.

In an embodiment, the foldable display device may further include an electrochromic window disposed between the transparent insulating layer and the transparent conductive pattern. In such an embodiment, the foldable display panel may further include a transparent display area including a plurality of pixels, and the pixels of the transparent display area may overlap the electrochromic window.

Embodiments of a foldable display device in accordance with the disclosure may be implemented in an in-folding manner. A transparent light transmitting area including an input sensor may be defined in a portion of a support structure. In such embodiments, a user is allowed to check display information when the foldable display device is in a folded state without providing an additional display panel on a second surface (opposite to a foldable display panel) of the support structure, such that the production cost, the thickness, the power consumption, etc. of the foldable display device may be substantially reduced.

In such embodiments, when the foldable display device is in the folded state, an image and/or an application may be controlled by the input sensor installed in the light transmitting area of the support structure. Accordingly, use convenience of the in-folding type foldable display device may be enhanced.

BRIEF DESCRIPTION OF THE DRAWINGS

The above and other features of the invention will become more apparent by describing in further detail exemplary embodiments thereof with reference to the accompanying drawings, in which;

FIG. 3A is a diagram illustrating an exemplary embodiment of the foldable display device of FIG. 1 in a folded state;

FIG. 11A is a plan view illustrating an exemplary of a transparent display area of a foldable display panel included in the foldable display device of FIG. 8;

DETAILED DESCRIPTION

Figure 1:
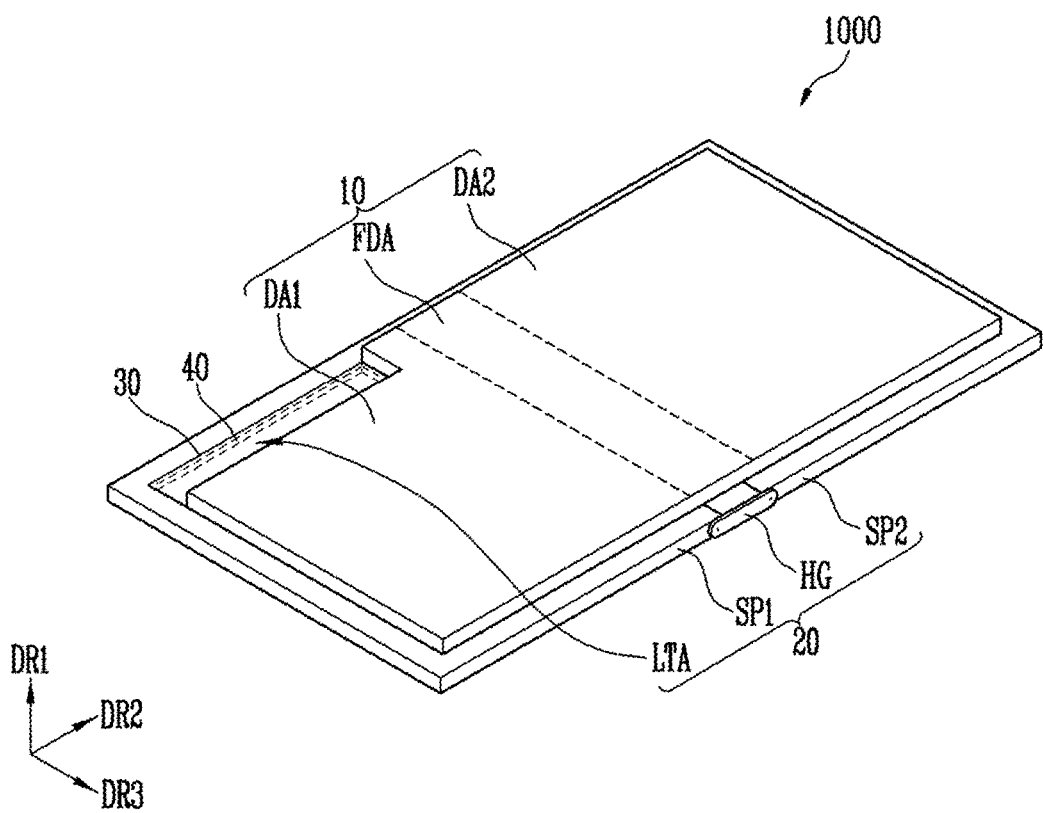
FIG. 1 is a diagram illustrating a foldable display device in accordance with an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region,"

"layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." "At least one of A and B" means "A and/or B." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, embodiments of the invention will be described in detail with reference to the accompanying drawings.

Figure 2A:
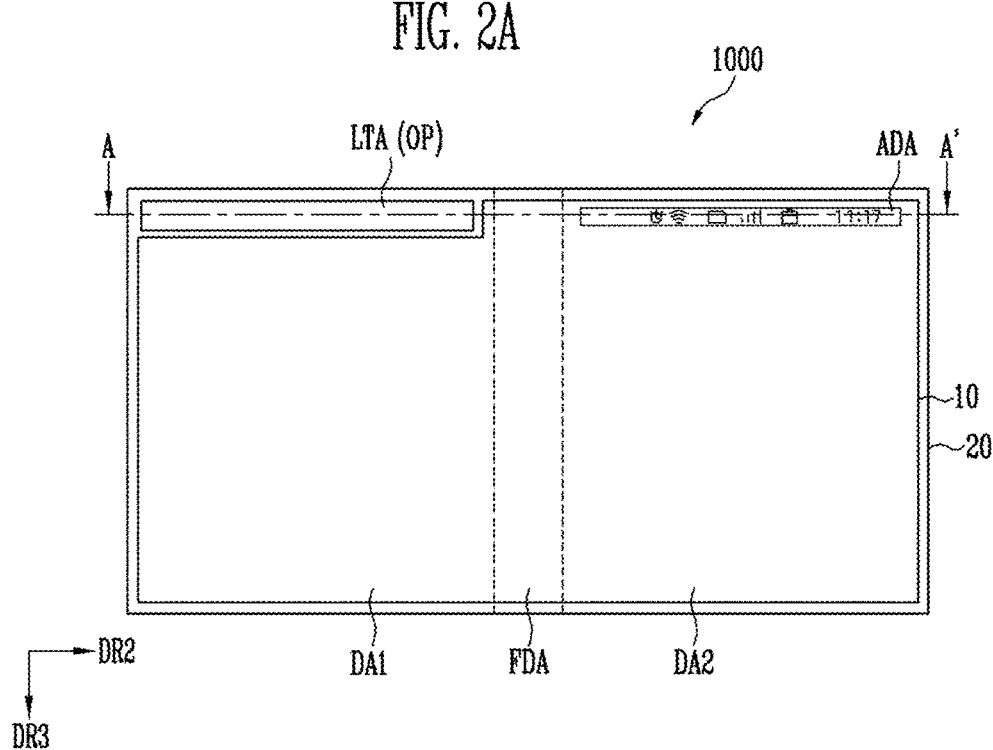
FIG. 2A is a plan view illustrating the foldable display device of FIG. 1 in an unfolded state.
Figure 2B:
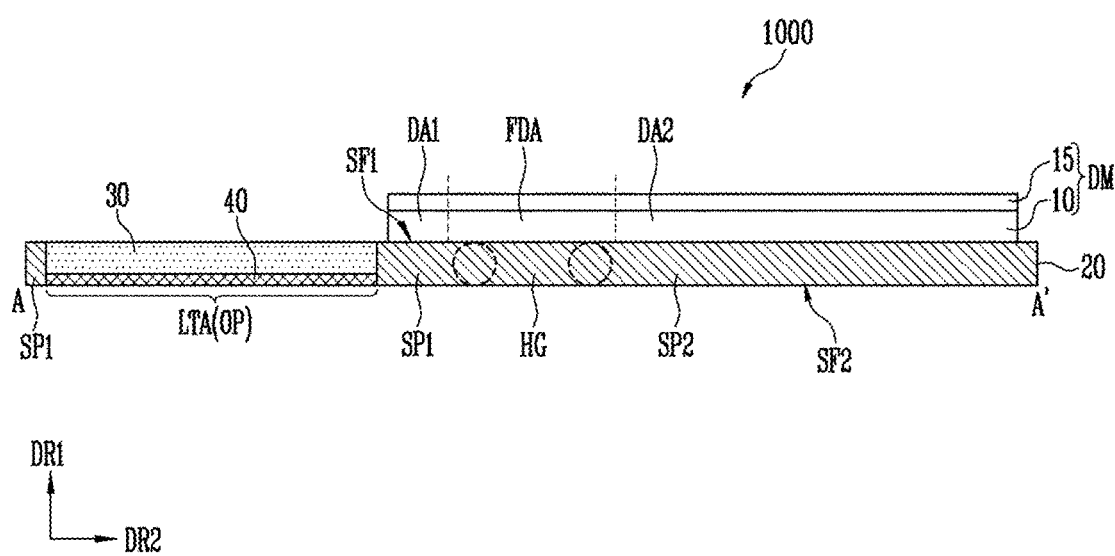
FIG. 2B is a cross-sectional view taken along line A-A' of FIG. 2A.

FIG. 1 is a diagram illustrating a foldable display device 1000 in accordance with an embodiment of the disclosure. FIG. 2A is a plan view illustrating the foldable display device 1000 of FIG. 1 in an unfolded state. FIG. 2B is a cross-sectional view taken along line A-A' of FIG. 2A.

Referring to FIGS. 1 to 2B, an embodiment of the foldable display device 1000 may include a foldable display panel 10, a support structure 20, and an input sensor (or a first input sensor) 40.

As illustrated in FIG. 1, an embodiment of the foldable display device 1000 may display an image through a display surface defined thereon (e.g., indicated by "FDA", "DA1", and "DA2"). The display surface of the foldable display device 1000 is parallel with a plane defined by a second directional axis DR2 and a third directional axis DR3 when the foldable display device 1000 is in an unfolded state (or a completely unfolded state). A normal direction of the plane defined by a second directional axis DR2 and a third directional axis DR3, i.e., a thickness direction of the foldable display device 1000, corresponds to a first directional axis DR1.

A front surface (or an upper surface) and a rear surface (or a lower surface) of each of elements, which will be described herein below, are defined based on the third directional axis DR3. However, the first to third directional axes DR1, DR2, and DR3 shown in the drawings are merely exemplary, and directions indicated by the first to third directional axes DR1, DR2 and DR3 are relative concepts and may be changed to other directions. Hereinafter, first to third directions are directions indicated by the first to third directional axes DR1, DR2, and DR3, and will be designated by the same reference characters as those of the first to third directional axes DR1, DR2, and DR3, respectively.

In an embodiment, the foldable display device 1000 may be folded in an in-folding manner in a way such that portions of the display surface face each other. In such an embodiment, the foldable display device 1000 may further include an area that is folded in an out-folding manner, or may include a plurality of folding areas.

In an embodiment of the foldable display device 1000, as illustrated in FIGS. 1 to 2B, a folding axis may be parallel with the third direction DR3, and a light transmitting area LTA and an opening OP, which extend from the folding axis in the second direction DR2, are defined. In one embodiment, for example, the foldable display device 1000 may be applied to an electronic apparatus which is folded sideways.

The foldable display panel 10 may include a flexible substrate such as a plastic film, and display an image using a pixel circuit (a plurality of transistors) disposed on the flexible substrate and a light emitting element such as an organic light emitting diode. The light emitting element and the pixel circuit may be covered with a thin-film encapsulation layer. The thin-film encapsulation layer seals the light emitting element from external environment including water and oxygen, thus effectively preventing deterioration in characteristics. In such an embodiment, the light emitting element is not limited to the organic light emitting diode. In one embodiment, for example, the light emitting element may be an inorganic light emitting element including inorganic light emitting material, or a light emitting element including quantum dots which emits light while changing the wavelength of light to be emitted using the quantum dots (e.g., a quantum dot display element).

A transparent cover window (not shown) may be provided on the outside of the display surface of the foldable display panel 10. The cover window allows an image of the foldable display panel 10 to pass therethrough as it is, and protects the foldable display panel 10 from external shock, scratches, etc. The cover window may include a transparent material having hardness and flexibility.

A second input sensor 15 for sensing a touch operation of a user may be disposed between the foldable display panel 10 and the cover window.

The second input sensor 15 may function as a touch sensor and/or a force sensor. In an embodiment, the second input sensor 15 may be directly disposed on the display surface of the foldable display panel 10 or attached to the display surface of the foldable display panel 1 by an adhesive. In an embodiment, the second input sensor 15 may be disposed or installed in the foldable display panel 10 in an in-cell manner.

The foldable display panel 10, the second input sensor 15 and the cover window may collectively define a display module DM. Hereinafter, the term "foldable display panel" may mean the display module DM.

The foldable display panel 10 may be disposed on a first surface SF1 of the support structure 20. The foldable display panel 10 may include a foldable display area FDA corresponding to a hinge HG (and portions of supports SP1 and SP2 adjacent to the hinge HG), and display areas DA1 and DA2 disposed on opposite sides of the foldable display area FDA. The foldable display area FDA may be a part which directly bends when a folding operation of the foldable display device 1000 is performed.

The support structure 20 may be disposed on the foldable display panel 10 at a position opposite to the display surface, and support the foldable display panel 10 such that the foldable display panel 10 is maintained in a predetermined shape.

The support structure 20 enables the foldable display panel 10 to be maintained in a flat shape when the foldable display device 1000 is unfolded, and enables the foldable display panel 10 to be maintained in a predetermined folded shape when the foldable display device 1000 is folded. In such an embodiment, the support structure 20 may protect the foldable display panel 10 from external shock, contamination, etc.

In an embodiment, the support structure 20 may include the hinge HG, and a pair of supports SP1 and SP2 which are disposed on opposite sides of the hinge HG and coupled to the hinge HG One surface of each of the supports SP1 and SP2 that faces the foldable display panel 10 may be planar. The pair of supports SP1 and SP2 may rotate around the hinge HG to enable the foldable display device 1000 to be folded or unfolded.

The first support SP1 may support the first display area DA1, and the second support SP2 may support the second display area DA2.

In an embodiment, another surface of each of the supports SP1 and SP2 that forms the appearance of the foldable display device 1000 may be planar or may have at least one curved surface.

The hinge HG may have a uniaxial hinge structure or a biaxial hinge structure. In an embodiment, where the uniaxial hinge structure includes a single rotating shaft, and the pair of supports SP1 and SP2 are rotatably coupled to the single rotating shaft. In an alternative embodiment, where the biaxial hinge structure includes two rotating shafts, and the pair of supports SP1 and SP2 are rotatably coupled to the respective rotating shafts. FIG. 1 and the other drawings illustrate embodiments where the hinge HG has a biaxial hinge structure, but not being limited thereto.

In an embodiment of the foldable display panel 10, the foldable display area (FDA, a bending area) that is not attached to the supports SP1 and SP2 and/or portions of the display areas DA1 and DA2 that are adjacent to the foldable display area FDA are not directly affected by binding force of the supports SP1 and SP2.

The light transmitting area LTA may be defined in a portion of the support structure 20. Light between the first surface SF1 and the second surface SF2 of the support structure 20 may pass through the light transmitting area LTA. In an embodiment, the support structure 20 may include the opening OP corresponding to the light transmitting area LTA. In such an embodiment, the light transmitting area LTA may correspond to the opening OP of the support structure 20.

In an embodiment, a transparent insulating layer 30 may be disposed or inserted into the light transmitting area LTA (or the opening OP). The transparent insulating layer 30 may be in a form of a film or a substrate. In an embodiment, as shown in FIG. 2B, the transparent insulating layer 30 may be inserted into the opening OP of the support structure 20, but the disposition of the transparent insulating layer 30 is not limited thereto. In one embodiment, for example, the transparent insulating layer 30 may extend onto a portion of the first surface SF1 of the support structure 20.

In an embodiment, as shown in FIG. 2B, the thickness of the transparent insulating layer 30 with respect to the first direction DR1 is less than that of the support structure 20, but not being limited thereto. Alternatively, the thickness of the transparent insulating layer 30 may be greater than that of the support structure 20. In one embodiment, for example, the transparent insulating layer 30 may have a shape protruding from the first surface SF1 and/or the second surface SF2 of the support structure 20.

In an embodiment, the transparent insulating layer 30 may include a glass or a transparent resin, for example. In one embodiment, for example, the transparent insulating layer 30 may include polyimide ("PI"), polyethylene terephthalate ("PET") or polyethylene naphthalate ("PEN"), for example.

In an embodiment, the foldable display panel 10 may be disposed on the first surface SF1 of the support structure 20 without covering the light transmitting area LTA. In such an embodiment where the transparent area LTA is defined in the first support SP1 that overlaps the first display area DA1, a surface area of the first display area DA1 may be less than a surface area of the second display area DA2. Herein, when two elements overlap each other, the two elements may overlap each other when viewed from a plan view in the first direction DR1.

The light transmitting area LTA may be defined to correspond to an auxiliary display area ADA on which an image including predetermined display information is displayed. In one embodiment, for example, the auxiliary display area ADA is included in a portion of the second display area DA2, and the light transmitting area LTA may be defined in a portion of the first support SP1 that overlaps the auxiliary display area ADA of the second display area DA2 when the foldable display device 1000 is folded.

Information such as the current date, the current time, battery information, communication signal strength, wireless internet information, and a message alarm may be displayed on the auxiliary display area ADA. In addition, various kinds of information corresponding to use environment may be displayed on the auxiliary display area ADA.

In an embodiment, as shown in FIGS. 1 to 2B, the light transmitting area LTA may have a rectangular planar shape, but the shape of the light transmitting area LTA in a plan view is not limited thereto. Alternatively, the light transmitting area LTA may have various planar shapes such as a circular planar shape or an elliptical planar shape, depending on purposes of use of the display device.

The first input sensor 40 may be disposed at a position spaced apart from the foldable display panel 10. The first input sensor 40 may be disposed in the light transmitting area LTA of the support structure 20. In an embodiment, the first input sensor 40 may be disposed on one surface of the transparent insulating layer 30. In one embodiment, for example, the first input sensor 40 may be disposed on an outer surface of the transparent insulating layer 30 of the support structure 20 that corresponds to the second surface SF2. Therefore, when the foldable display panel 10 and the foldable display device 1000 are folded, the transparent insulating layer 30 may be disposed between the first input sensor 40 and the foldable display panel 10.

The first input sensor 40 may sense an input operation of the user. In an embodiment, the first input sensor 40 may be a touch sensor or a pressure sensor, which includes a transparent conductive pattern. In one embodiment, for example, the first input sensor 40 may sense a touch by a capacitance method, an electromagnetic induction method or a pressure sensitive method, for example.

In an embodiment, the first input sensor 40 may sense an external input by an ultrasonic sensing method or an optical sensing method. In one embodiment, for example, the first input sensor 40 may function as at least one of a touch sensor, a fingerprint sensor, a force sensor, and an iris sensor.

In an embodiment, the transparent conductive pattern may include a transparent conductive oxide such as indium tin oxide ("ITO"), indium zinc oxide ("IZO"), indium gallium zinc oxide ("IGZO"), zinc oxide (ZnO), or indium tin zinc oxide ("ITZO"). In an alternative embodiment, the transparent conductive pattern may include a conducting polymer such as poly(3,4-ethylenedioxythiophene) ("PEDOT"), a metal nanowire, a carbon nanotube, graphene, etc. The transparent conductive pattern may have a fine mesh structure. Accordingly, in such an embodiment, the light transmitting area LTA and the first input sensor 40 having the transparent conductive pattern may have high light transmissivity.

In an embodiment, when the foldable display device 1000 is unfolded, the first input sensor 40 may be inactivated. In one embodiment, for example, when the foldable display device 1000 is unfolded, the supply of power to the first input sensor 40 may be interrupted.

Figure 3B:
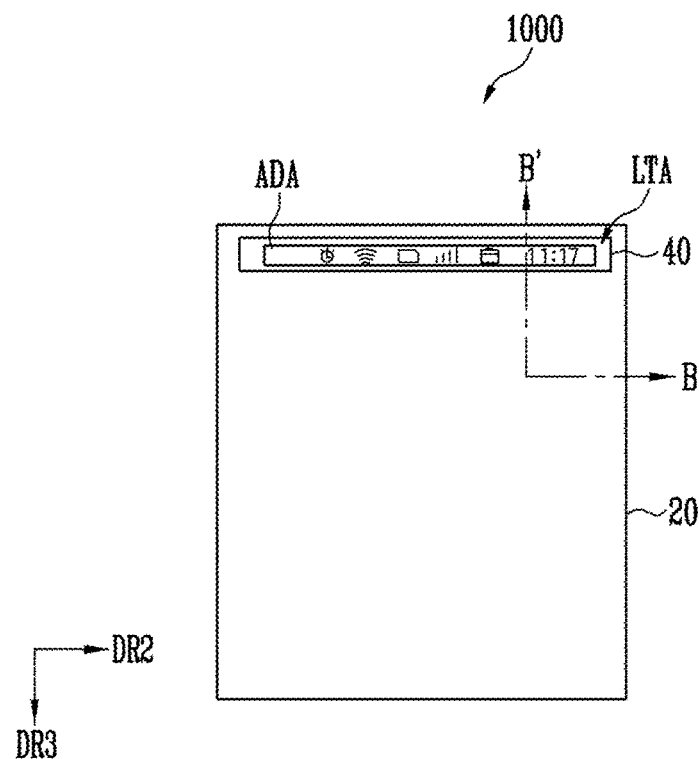
FIG. 3B is a plan view of an exemplary embodiment of the foldable display device of FIG. 1 in a folded state.
Figure 3C:
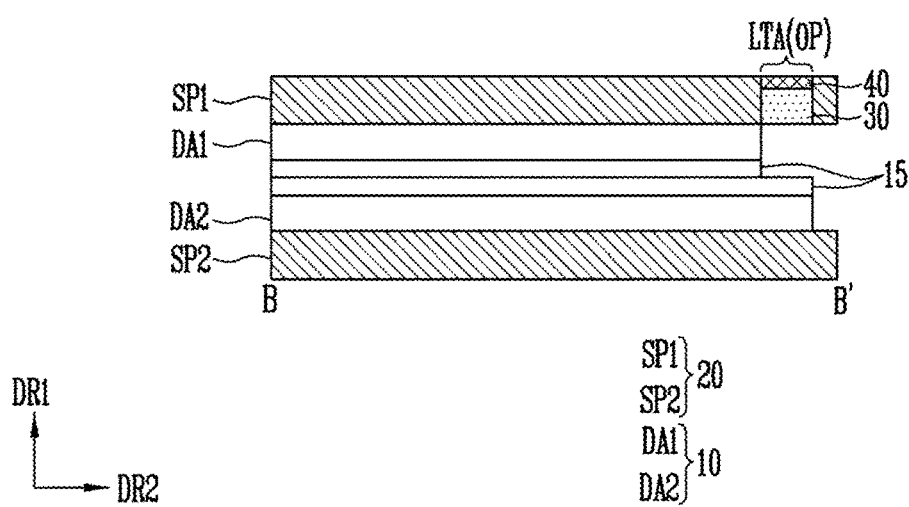
FIG. 3C is a cross-sectional view taken along line B-B' of FIG. 3B.

FIG. 3A is a diagram illustrating an exemplary embodiment of the foldable display device 1000 of FIG. 1 in a folded state. FIG. 3B is a plan view of an exemplary embodiment of the foldable display device 1000 of FIG. 1 in a folded state. FIG. 3C is a cross-sectional view taken along line B-B' of FIG. 3B.

In FIGS. 3A to 3C, like reference numerals will be used to designate the same or like components as those described with reference to FIGS. 1 to 2B, and any repetitive detailed description of the same or like components will be omitted.

Referring to FIGS. 1 to 3C, an embodiment of the foldable display device 1000 may include the foldable display panel 10, the support structure 20, and the input sensor (or the first input sensor) 40.

When the foldable display device 1000 is folded, the light transmitting area LTA of the support structure 20 may overlap a portion of the foldable display panel 10 (e.g., a portion of the second display area DA2). In one embodiment, for example, the light transmitting area LTA of the support structure 20 may overlap the auxiliary display area ADA of the second display area DA2. Therefore, an image of the auxiliary display area ADA is visible to the user through the light transmitting area LTA.

The transparent insulating layer 30 and the first input sensor 40 may be disposed in the light transmitting area LTA. The outer surface of the light transmitting area LTA and the outer surface of the support structure 20 surrounding the light transmitting area LTA may have or form a continuous plane. In such an embodiment, the outer surfaces of the support structure 20 and the light transmitting area LTA may correspond to the second surface SF2 that is opposite to the first surface SF1 of the support structure 20 on which the foldable display panel 10 is disposed.

In an alternative embodiment, the outer surface of the light transmitting area LTA may protrude from the second surface SF2 of the support structure 20 or have a concave shape.

In an embodiment, as illustrated in FIG. 3C, when the foldable display device 1000 is folded, the transparent insulating layer 30 may be disposed between the first input sensor 40 and the foldable display panel 10 or the second display area DA2. Since the first display area DA1 corresponding to the first support SP1 does not overlap the light transmitting area LTA in the folded state, the user may be allowed to view, through the light transmitting area LTA, an image displayed on the second display area DA2. In one embodiment, for example, the auxiliary display area ADA included in the second display area DA2 may overlap the light transmitting area LTA with respect to the first direction DR1 such that the auxiliary display area ADA is visible to the user through the light transmitting area LTA, but not being limited thereto. Alternatively, the image displayed through the light transmitting area LTA may include various other types of information determined based on use environment.

In an embodiment, when the foldable display device 1000 is in the folded state, a length of the first display area DA1 of the foldable display panel 20 in the second direction DR2 may be less than a length of the second display area DA2 in the second direction DR2. In such an embodiment, the first display area DA1 does not overlap the light transmitting area LTA.

In an embodiment, when the foldable display device 1000 is folded, the first input sensor 40 may be activated. Hence, when the foldable display device 1000 is in the folded state, the first input sensor 40 of the light transmitting area LTA may perform a touch sensing and/or pressure sensing operation. In one embodiment, for example, image information displayed on the auxiliary display area ADA may change in response to a touch sensed by the first input sensor 40. In such an embodiment, an electronic device including the foldable display device 1000, such as a smartphone, may activate an application, such as volume control, music play, transmitting/receiving a phone call or sending a message, in response to a touch sensed by the first input sensor 40.

In an embodiment in accordance with the invention, as described above, the foldable display device 1000, which is in-foldable, may include the light transmitting area LTA that includes the first input sensor 40 and is defined in the portion of the support structure 20, on which the foldable display panel 10 is not provided or formed. Therefore, the user is allowed to check displayed information when the foldable display device 1000 is in the folded state without providing an additional display panel on the second surface SF2 of the support structure 20. Accordingly, in such an embodiment, the production cost, the thickness, the power consumption, etc. of the foldable display device due to addition of a display panel may be effectively prevented from increasing.

In such an embodiment, the first input senor 40 disposed in the light transmitting area LTA may allow a user to interact with display information of the auxiliary display area ADA and to activate the operation of an application corresponding to the display information when the foldable display device 1000 is in the folded state, such that the use convenience of the in-folding type foldable display device 1000 may be enhanced.

Figure 4A:
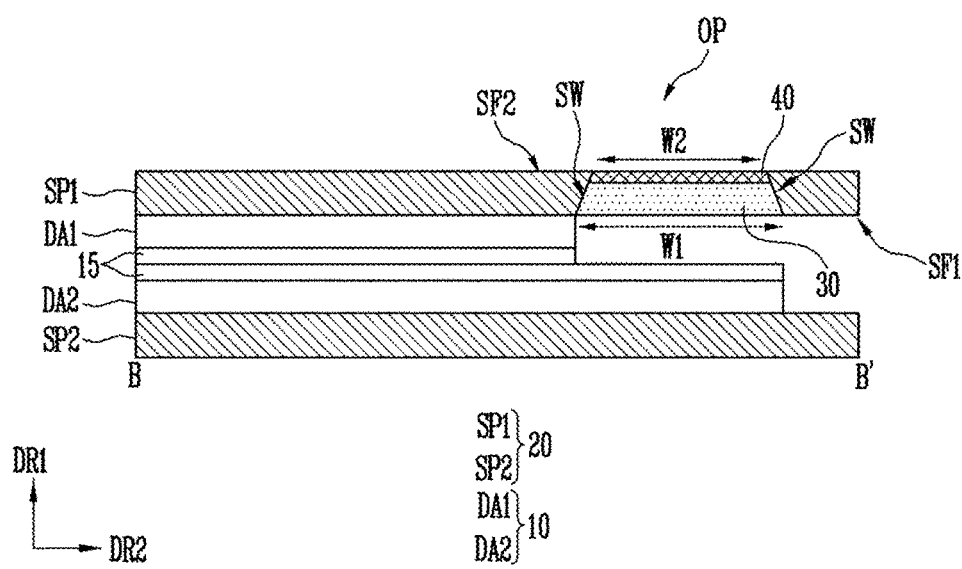
FIG. 4A is a cross-sectional view of an alternative exemplary embodiment of the foldable display device of FIG. 1 in a folded state.
Figure 4B:
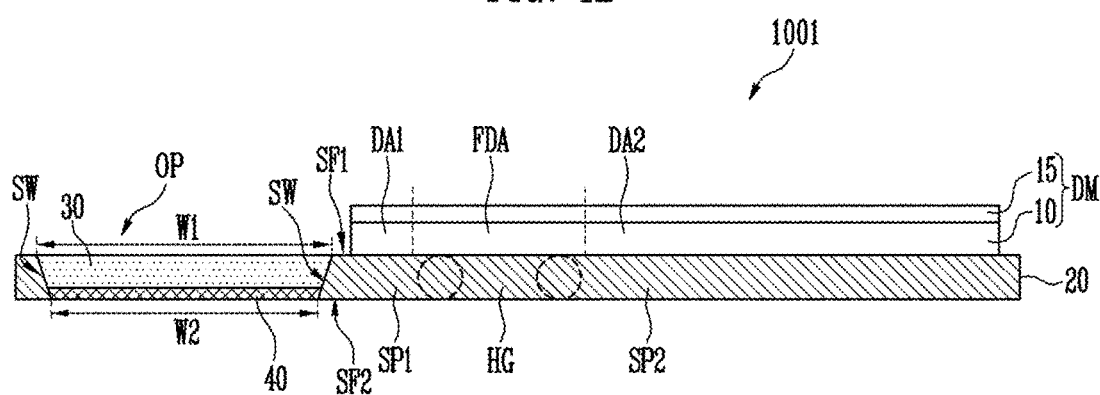
FIG. 4B is a cross-sectional view of the foldable display device of FIG. 4A in an unfolded state.

FIG. 4A is a cross-sectional view of an alternative exemplary embodiment of the foldable display device of FIG. 1 in a folded state. FIG. 4B is a cross-sectional view of the foldable display device of FIG. 4A in an unfolded state. FIG. 4A is a cross-sectional view corresponding to FIG. 3C, which is a cross-sectional view taken along line B-B' of FIG. 3B.

The foldable display device of FIGS. 4A and 4B may have a configuration identical or similar to the foldable display device of FIGS. 2B and 3C except for the shape of a sidewall of an opening of a support structure. In FIGS. 4A and 4B, like reference numerals will be used to designate the same or like elements as those described with reference to FIGS. 1 to 3C, and any repetitive detailed description of the same or like elements will be omitted.

Referring to FIGS. 2B, 3C, 4A, and 4B, in an embodiment, a transparent insulating layer 30 and a first input sensor 40 may be disposed in the opening (OP, the light transmitting area LTA of FIGS. 2B and 3C) of the support structure 20.

In such an embodiment, at least a portion of the sidewall SW of the opening OP of the support structure 20 may include an inclined surface which is inclined with respect to the first direction DR1. The inclined surface may have a planar shape or an at least partially curved shape. In an embodiment, a first width W1 of the opening OP that is defined on a plane in an extension of the first surface SF1 of the support structure 20 may be greater than a second width W2 of the opening OP that is defined on a plane in an extension of the second surface SF2 of the support structure 20.

In such an embodiment, as shown in FIG. 4A, when the foldable display device is in the folded state, the light transmitting area LTA may have a shape determined in a way such that the surface area thereof is reduced away from the second display area DA2 in the first direction DR1. Therefore, when the foldable display device is folded, the quantity of light that is incident on the display surface may be reduced, and scattering of light emitted from the display surface may be reduced. In such an embodiment, the visibility of an image of the second display area DA2 that is visible to the user through the light transmitting area LTA may be enhanced.

Figure 5:
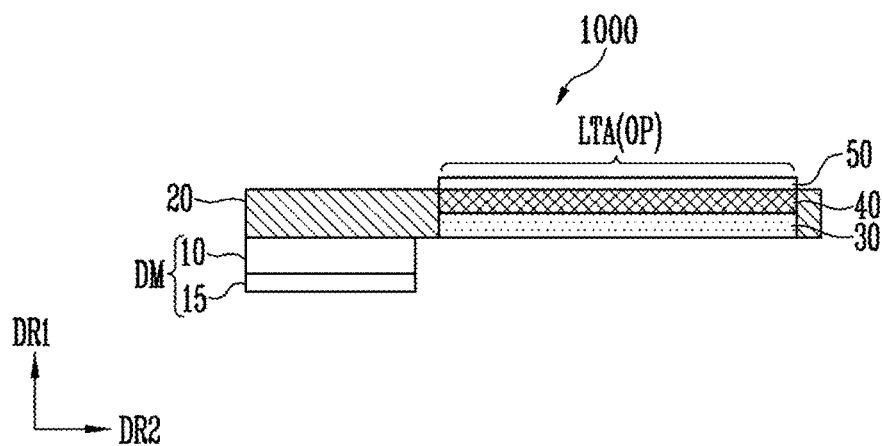
FIG. 5 is a cross-sectional view schematically illustrating another alternative exemplary embodiment of the foldable display device of FIG. 1.

FIG. 5 is a cross-section sectional view schematically illustrating another alternative exemplary embodiment of the foldable display device of FIG. 1.

The foldable display device of FIG. 5 may have a configuration substantially identical or similar to that of the foldable display device of FIG. 3C except for the configuration of a transparent protective layer disposed on the first input sensor. In FIG. 5, like reference numerals will be used to designate the same or like elements as those described with reference to FIGS. 1 to 3C, and repetitive detailed description of the or like elements will be omitted.

Referring to FIGS. 2B, 3C, and 5, in an embodiment, a transparent insulating layer 30, a first input sensor 40, and a transparent protective layer 50 may be disposed on the light transmitting area LTA.

FIG. 5 illustrates only a portion of the first support SP1 and only a portion of the first display area DA1 of the foldable display panel 10.

The first input sensor 40 may include a transparent conductive pattern.

The transparent protective layer 50 may be disposed on the first input sensor 40 that is disposed on the transparent insulating layer 30. The transparent protective layer 50 may cover the first input sensor 40 and protect the first input sensor 40 from external shock, scratches, contaminant material, etc. The transparent protective layer 50 may include a glass, a plastic or a transparent polymer synthetic resin, for example.

In an embodiment, as shown in FIG. 5, the thickness of the transparent insulating layer 30 with respect to the first direction DR1 may be less than that of the support structure 20, but not being limited thereto. Alternatively, the thickness of the transparent insulating layer 30 may be greater than that of the support structure 20. In one embodiment, for example, the transparent insulating layer 30 may protrude from the first surface (e.g., designated by "SF1" in FIG. 2B) of the support structure 20 and/or the second surface (e.g., designated by "SF2" in FIG. 2B).

Figure 6A:
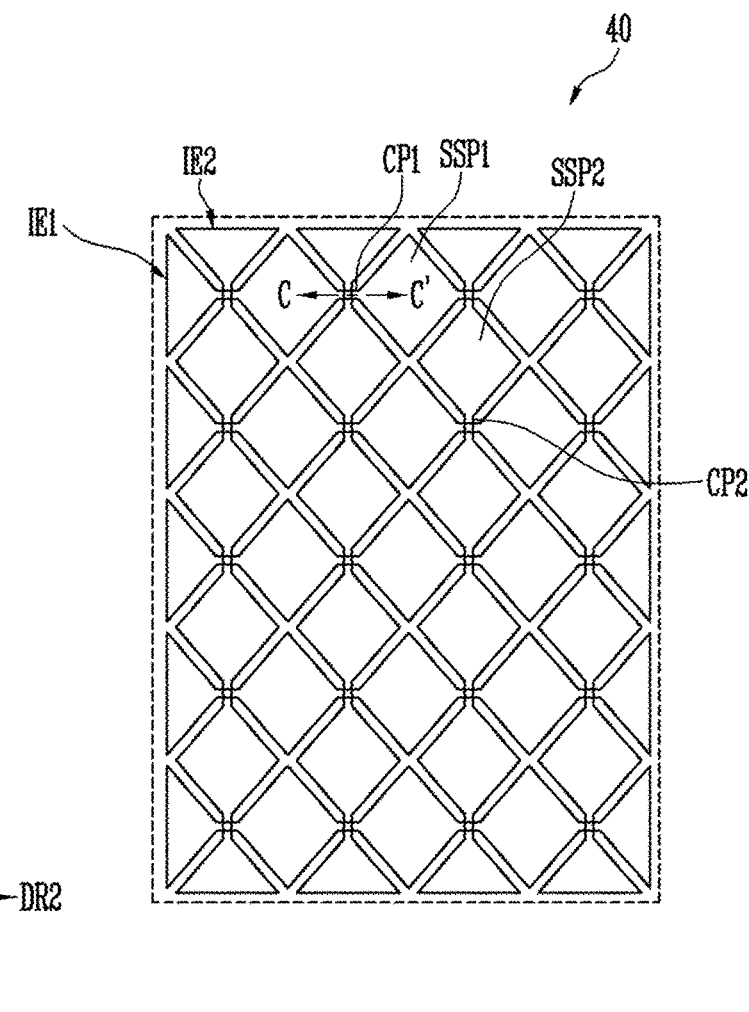
FIG. 6A is a plan view illustrating an exemplary embodiment of an input sensor disposed in a light transmitting area of the foldable display device of FIG. 1.
Figure 6B:
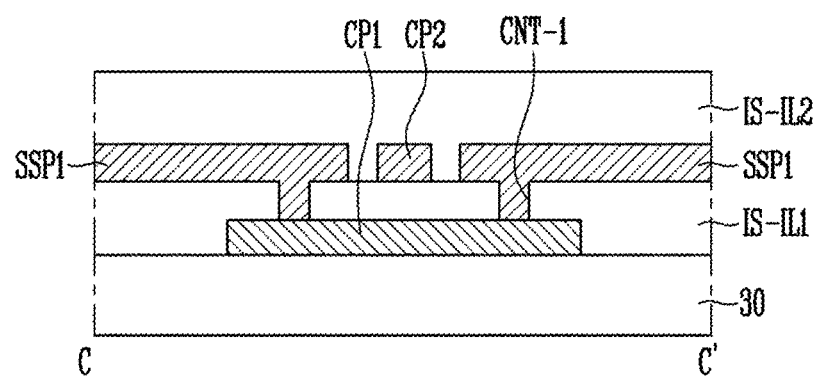
FIG. 6B is a cross-sectional view taken along line C-C' of FIG. 6A.

FIG. 6A is a plan view illustrating an exemplary embodiment of the input sensor disposed in the light transmitting area of the foldable display device of FIG. 1. FIG. 6B is a cross-sectional view taken along line C-C' of FIG. 6A.

In such an embodiment, the input sensor may be substantially the same as the first input sensor 40 described above.

Referring to FIGS. 1, 2A, 6A, and 6B, the first input sensor 40 (hereinafter, referred to as the input sensor 40) may include first sensing electrodes IE1, first signal lines (not illustrated) coupled to the first sensing electrodes IE1, second sensing electrodes IE2, and second signal lines (not illustrated) coupled to the second sensing electrodes IE2.

In an embodiment, the first sensing electrodes IE1 and the second sensing electrodes IE2 intersect with each other, while being spaced apart from each other in the first direction DR1. The first sensing electrodes IE1 may be arranged in the third direction DR3, and each of the first sensing electrodes IE1 may extend in the second direction DR2. The second sensing electrodes IE2 may be arranged in the second direction DR2, and each of the second sensing electrodes IE2 may extend in the third direction DR3. The first sensing electrodes IE1 and the second sensing electrodes IE2 may sense an external input in a mutual capacitance manner and/or a self-capacitance manner.

The first and second sensing electrodes IE1 and IE2 may include a transparent conductive material. In one embodiment, for example, the first and second sensing electrodes IE1 and IE2 may include a transparent conductive oxide such as ITO, IZO, IGZO, ZnO, or ITZO. In an alternative embodiment, the transparent conductive pattern may include a conducting polymer such as PEDOT, a metal nanowire, a carbon nanotube, graphene, etc.

Each of the first sensing electrodes IE1 may include first sensor parts SSP1 and first connectors CP1. Each of the second sensing electrodes IE2 may include second sensor parts SSP2 and second connectors CP2. Among the first sensor parts SPP1, each of two first sensor parts SPP1 that are disposed on respective opposite ends of each first sensing electrode IE1 may have a size smaller than that of a first sensor part SPP1 disposed in a central portion of the first sensing electrode IE1, e.g., a size corresponding to about a half (½) of the first sensor part SPP1 disposed in the central portion. Among the second sensor parts SPP2, each of two second sensor parts SPP2 that are disposed on respective opposite ends of each second sensing electrode IE2 may have a size smaller than that of a second sensor part SPP2 disposed in a central portion of the second sensing electrode IE2, e.g., a size corresponding to about a half (½) of the second sensor part SPP2 disposed in the central portion.

In such an embodiment, the shape of each sensing electrode is not limited to that shown in FIG. 6A. In an alternative embodiment, each of the first and second sensing electrodes IE1 and IE2 may have a shape (e.g., a bar shape) without distinction between the sensor parts and the connectors. In an embodiment, as shown in FIG. 6A, each of the first and second sensor parts SPP1 and SPP2 may have a rhombus shape, but not being limited thereto. Alternatively, the first sensors SP1 and the second sensors SP2 may have other polygonal shapes. In an embodiment, the first sensing electrodes IE1 and the second sensing electrodes IE2 may be disposed on the transparent insulating layer 30 in the pattern of a mesh formed of a transparent conductive material.

Each of the first connectors CP1 couples the corresponding adjacent first sensor parts SSP1 to each other. Each of the second connectors CP2 couples the corresponding adjacent second sensor parts SSP2 to each other.

FIG. 6B illustrates a stacked structure of an exemplary embodiment of the input sensor 40. In an embodiment, as illustrated in FIG. 6B, the first sensor parts SSP1 may be electrically coupled to the corresponding first connector CP1 through a first connection contact hole CNT-1.

The first connector CP1 may intersect with the corresponding second connector CP2. In such an embodiment, the width (measured on a plane) of the first connector CP1 be determined to be substantially small or minimized to reduce the effect of parasitic capacitance.

In an embodiment, the input sensor 40 may further include a first insulating layer IS-IL1 disposed on the transparent insulating layer 30 and configured to cover the first connector CP1, and a second insulating layer IS-IL2 disposed on the first insulating layer IS-IL1. The first and second insulating layers IS-IL1 and IS-IL2 may be transparent insulating layers. In one embodiment, for example, the first insulating layer IS-IL1 may be a polymer layer, e.g., an acrylic polymer layer. In such an embodiment, the second insulating layer IS-IL2 may be a polymer layer, e.g., an acrylic polymer layer. The first and second insulating layers IS-IL1 and IS-IL2 may be elastic transparent insulating layers.

In such an embodiment, the configuration and function of the input sensor 40 described herein are merely exemplary, and not being limited thereto.

Figure 7:
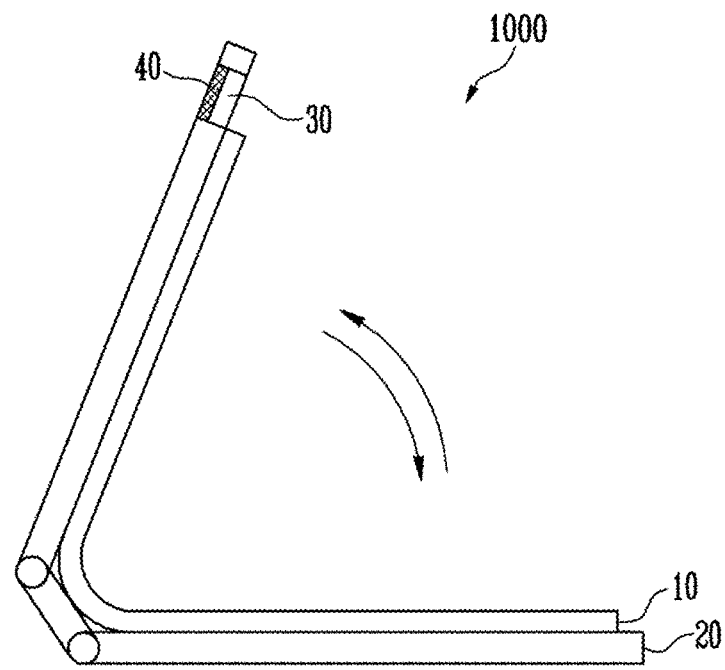
FIG. 7 is a diagram illustrating a folding operation of an exemplary embodiment of the foldable display device of FIG. 1.

FIG. 7 is a diagram illustrating a folding operation of an exemplary embodiment of the foldable display device 1000 of FIG. 1.

In FIG. 7, like reference numerals will be used to designate the same or like elements as those described with reference to FIGS. 1 to 2B, and any repetitive detailed description of the same or like components will be omitted.

Referring to FIG. 7, an embodiment of the foldable display device 1000 may be folded in an in-folding manner such that the display surfaces of the foldable display panel 10 face each other in a folded state.

In an embodiment, when the foldable display panel 10 is folded to an angle less than a predetermined reference angle, the input sensor 40 may be activated. Hence, when the foldable display device 1000 is in the folded state, the input sensor 40 of the light transmitting area LTA may perform a touch sensing and/or pressure sensing operation. In one embodiment, for example, in response to a touch sensed by the input sensor 40, image information displayed on the auxiliary display area ADA may change, or a predetermined application may be operated. In one embodiment, for example, the reference angle may be about 30°.

In such an embodiment, when the foldable display panel 10 is unfolded to the reference angle or more, the input sensor 40 may be inactivated. In one embodiment, for example, when the foldable display device 1000 is unfolded, the supply of power to the first input sensor 40 may be interrupted. Therefore, when the foldable display device 1000 is in the unfolded state, a malfunction due to an unintentional touch on the input sensor 40 may be effectively prevented.

Figure 8:
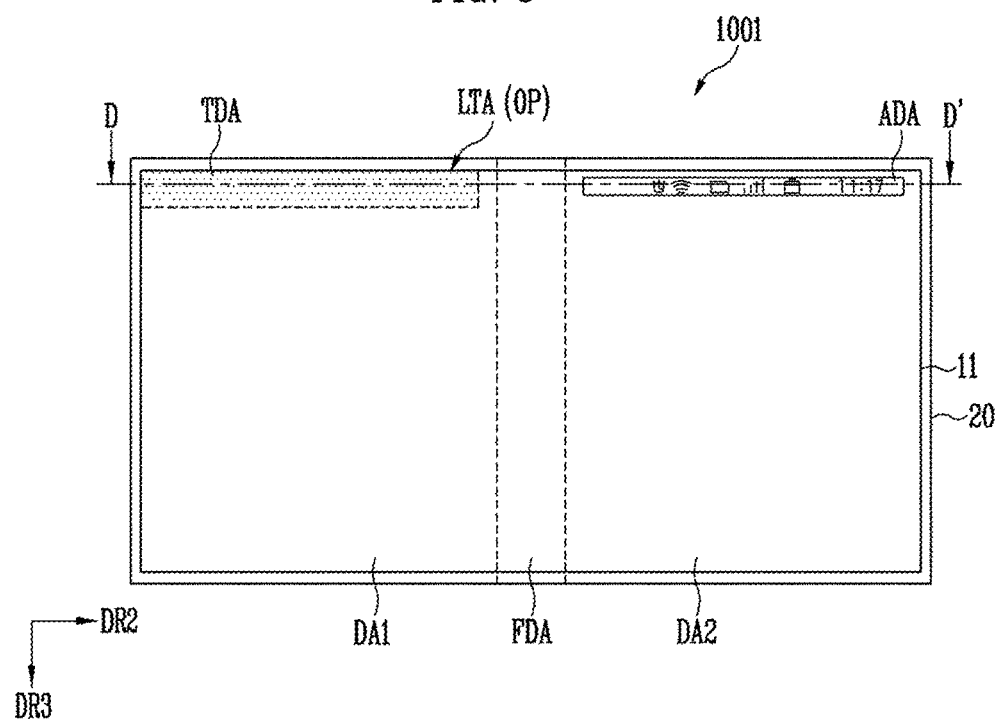
FIG. 8 is a plan view illustrating an exemplary embodiment of the foldable display device in an unfolded state.
Figure 9A:
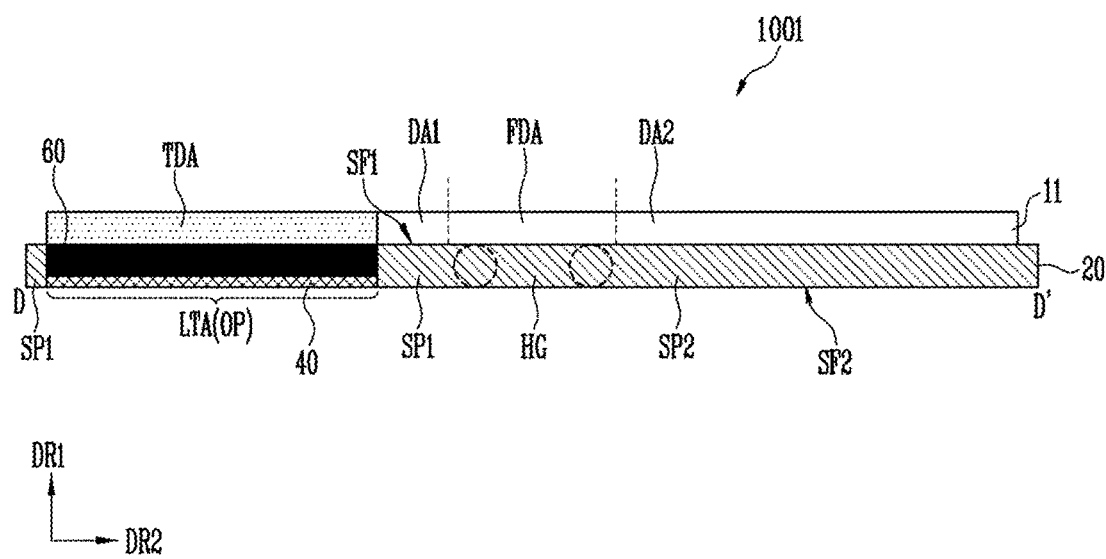
FIG. 9A is a cross-sectional view taken along line D-D' of FIG. 8.
Figure 9B:
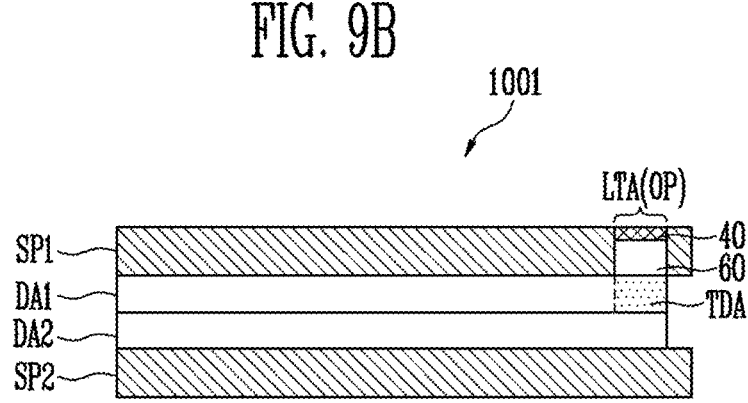
FIG. 9B is a cross-sectional view schematically illustrating a portion of the foldable display device of FIG. 8 that is in the folded state.

FIG. 8 is a plan view illustrating an exemplary embodiment of the foldable display device in an unfolded state. FIG. 9A is a cross-sectional view taken along line D-D' of FIG. 8. FIG. 9B is a cross-sectional view schematically illustrating a portion of the foldable display device of FIG. 8 that is in the folded state.

The foldable display device of FIGS. 8 to 9B may have a configuration substantially identical or similar to that of the foldable display device of FIGS. 1 to 3C except for the configuration of a light transmitting area and the configuration of a foldable display panel corresponding thereto. In FIGS. 8 to 9B, like reference numerals will be used to designate the same or like elements as those described with reference to FIGS. 1 to 3C, and any repetitive detailed description of the same or like components will be omitted or simplified.

Referring to FIGS. 8 to 9B, an embodiment of a foldable display device 1001 may include a foldable display panel 11, a support structure 20, an input sensor 40, and an electrochromic window 60.

The foldable display panel 11 may be disposed on a first surface SF1 of the support structure 20. The foldable display panel 10 may include a foldable display area FDA corresponding to a hinge HG (and portions of supports SP1 and SP2 adjacent to the hinge HG), and display areas DA1 and DA2 disposed on opposite sides of the foldable display area FDA.

The foldable display panel 11 may include a transparent display area TDA which overlaps the opening OP, i.e., the light transmitting area LTA, of the support structure 20. In one embodiment, for example, the transparent display area TDA may be included in a portion of the first display area DA1.

The transparent display area TDA may include a transmitting area and a pixel area, and may allow an image of an object disposed at a position opposite to a display surface to pass therethrough. In an embodiment, when the foldable display device 1001 is unfolded, some pixels included in the foldable display panel 11 may be disposed to overlap the light transmitting area TDA. In such an embodiment, the display areas FDA, DA1, DA2, and TDA may be variously modified, and the position or the shape of the light transmitting area LTA may be determined independently of the other display areas FDA, DA1 and DA2. In one embodiment, for example, the shape of the entire display area of the foldable display panel 11 in a plan view may be rectangular.

Therefore, when the foldable display device 1001 is the unfolded state, the foldable display panel 11 of FIG. 8 may have a display area greater than that of the embodiment of FIG. 1. In such an embodiment, since the first display area DA1 and the second display area DA2 are formed to be symmetrical with each other, the design of the pixels and lines coupled to the pixels may be facilitated.

In an embodiment, when the foldable display device 1001 is folded, the transparent display area TDA may overlap the auxiliary display area ADA. Hence, an image displayed on the auxiliary display area ADA may be visible to the user through the transparent display area TDA.

The opening OP corresponding to the light transmitting area LTA may be defined through the support structure 20. In such an embodiment, the light transmitting area LTA may correspond to the opening OP of the support structure 20.

In an embodiment, an electrochromic window 60 may be inserted into the light transmitting area LTA (i.e., the opening OP). The electrochromic window 60 may vary in transparency depending on an amount of current applied to the electrochromic window 60.

In an embodiment, when the foldable display device 1001 is unfolded, the electrochromic window 60 may be changed to be opaque. In such an embodiment, as illustrated in FIG. 9A, the display areas DA1, FDA, and DA2 including the transparent display area TDA emit light when the foldable display device 1001 is in the unfolded state, such that light transmission in the transparent display area TDA may be interrupted by the electrochromic window 60 that has been changed to be opaque. Therefore, a deviation between images displayed on the transparent display area and the other display areas may not be discerned by the user.

When the foldable display device 1001 is folded, the electrochromic window 60 may become transparent. In an embodiment, as illustrated in FIG. 9B, an image displayed on a portion of the second display area DA2 that overlaps the transparent display area TDA may be visible to the user through the transparent electrochromic window 60 and the transparent display area TDA. In an embodiment, when the foldable display device 1001 is folded, the image of the second display area DA2 may be turned off, and an image (e.g., an image of the auxiliary display area ADA of FIG. 3B) may be displayed on the transparent display area TDA. In this case, the image of the transparent display area TDA may be visible to the user through the transparent electrochromic window 60.

The input sensor 40 may be disposed on the electrochromic window 60. In an embodiment, the electrochromic window 60 may be disposed between the transparent display area TDA and the input sensor 40. The input sensor 40 may be activated when the foldable display device is folded. Therefore, when the foldable display device 1001 is in the folded state, the foldable display device 1001 may be controlled by a touch on the light transmitting area LTA.

In an embodiment of the invention, as described above, the foldable display device 1001 may include the transparent display area TDA, the electrochromic window 60, and the input sensor 40 that overlap the light transmitting area LTA. Therefore, when the foldable display device 1001 is in the unfolded state, an image having a stable aspect ratio may be displayed. When the foldable display device 1001 is in the folded state, an image of the auxiliary display area ADA may be visible to the user through the light transmitting area LTA, such that use convenience of the in-folding type foldable display device 1001 may be enhanced.

Figure 10:
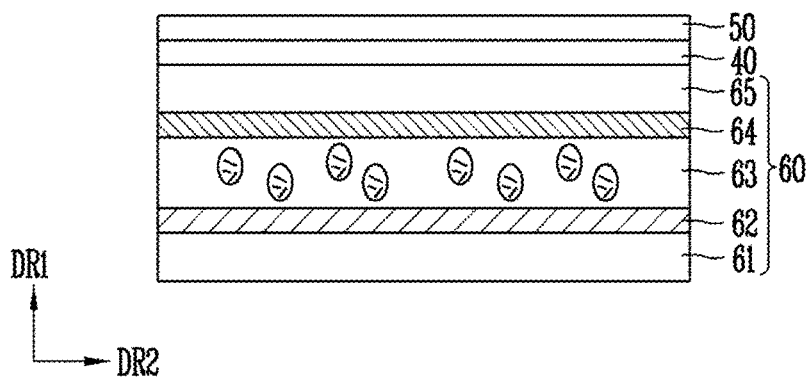
FIG. 10 is a cross-sectional view illustrating an exemplary embodiment of a light transmitting area of the foldable display device of FIG. 8.

FIG. 10 is a cross-sectional view illustrating an exemplary of the light transmitting area LTA of the foldable display device 1001 of FIG. 8.

Referring to FIGS. 8 to 10, the light transmitting area LTA of the foldable display device 1001 may include the electrochromic window 60 and the input sensor 40. The light transmitting area LTA of the foldable display device 1001 may further include a transparent protective layer 50 disposed on the input sensor 40.

In an embodiment, the electrochromic window 60 may include a first transparent insulating layer 61 disposed on a plane in an extension of the first surface SF1 of the support structure 20, a first transparent electrode layer 62 disposed on the first transparent insulating layer 61, a polymer dispersed liquid crystal ("PDLC") 63 disposed on the first transparent electrode layer 62, a second transparent electrode layer 64 disposed on the PDLC 63, and a second transparent insulating layer 65 disposed on the second transparent electrode layer 64.

Each of the first and second transparent insulating layers 61 and 65 may be a transparent insulating substrate or a transparent insulating film. In one embodiment, for example, each of the first and second transparent insulating layers 61 and 65 may include or be formed of PET, polycarbonate ("PC"), polymethyl methacrylate ("PMMA"), PEN, a PI film, polystyrene ("PS"), a glass, or a tempered glass. The disclosure is not limited to the above-listed materials, and any transparent substrate material known in the art may be used In such an embodiment, the first transparent insulating layer 61 may correspond to the transparent insulating layer 30 illustrated in FIG. 2A, for example.

The first and second transparent electrode layers 62 and 64 may include or be formed of a transparent and conductive material. In an embodiment, the first and second transparent electrode layers 62 and 64 may include a transparent conductive oxide such as ITO, IZO, IGZO, ZnO, or ITZO. In an alternative embodiment, the transparent conductive pattern may include at least one selected from a conducting polymer such as PEDOT, a metal nanowire, a carbon nanotube, and graphene.

In an embodiment, the PDLC 63 may be formed by mixing polymeric material which is hardened by ultraviolet rays or heat with liquid crystal, injecting the mixture into liquid crystal specimen, and exposing it to ultraviolet rays or heat. In such an embodiment, when polymeric materials are exposed to ultraviolet rays or heat and thus form a polymer, phase separation between the polymer and liquid crystal is induced, such that liquid crystal droplets may be formed in a polymer net. In an embodiment, the liquid crystal may be a nematic liquid crystal, cholesteric liquid crystal, a smectic liquid crystal or a ferroelectric liquid crystal, for example, but the disclosure is not limited thereto.

In such an embodiment, when a predetermined driving power supply is not applied to the electrochromic window 60, the liquid crystals in the liquid crystal droplets are arranged in arbitrary directions, and a difference may occur between an effective refractive index of the liquid crystal droplets and a refractive index of the polymer, such that incident light may be scattered to be opaque. Accordingly, when the driving power supply is not applied to the electrochromic window 60, the electrochromic window 60 may have an opaque state.

In such an embodiment, when the driving power supply is applied to the electrochromic window 60, the liquid crystals are aligned in one direction, and the refractive index of the liquid crystal droplets becomes substantially the same as that of the polymer, such that incident light may pass through the PDLC 63. Accordingly, when the driving power supply is applied to the electrochromic window 60, the electrochromic window 60 may have a transparent state.

In such an embodiment, at least one of the first and second transparent electrode layers 62 and 64 may be formed in a patterned shape to adjust the light transmissivity of the electrochromic window 60.

Figure 11B:
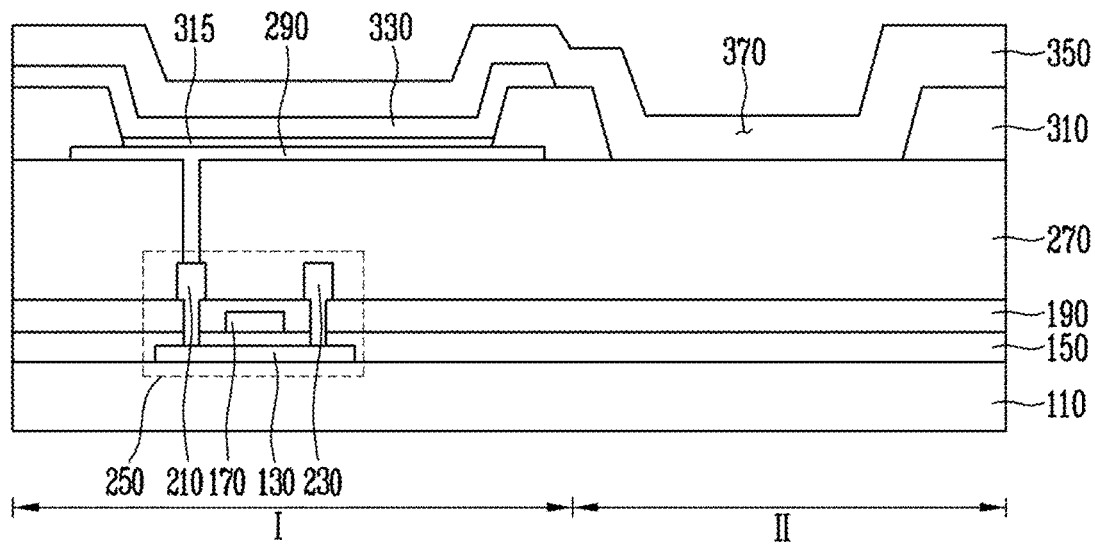
FIG. 11B is a cross-sectional view taken along line of FIG. 11A.

FIG. 11A is a plan view illustrating an exemplary of the transparent display area TDA of the foldable display panel 11 included in the foldable display device of FIG. 8. FIG. 11B is a cross-sectional view taken along line of FIG. 11A.

Referring to FIGS. 8, 11A, and 11B, the transparent display area TDA of the foldable display panel 11 may include a pixel area I and a transmitting area II. First to third sub-pixels 315, 320 and 325 may be disposed in the pixel area I, and a transmitting window 370 may be disposed in the transmitting area II.

The first to third sub-pixels 315, 320 and 325 may respectively emit different colors of light. In one embodiment, for example, each of the first to third sub-pixels 315, 320 and 325 may emit one of a red light, a green light, and a blue light.

In the transmitting area II, the transmitting window 370 may allow external incident light to pass therethrough. Here, common lines (a data line, a scan line, a power supply line, etc.) and insulating layers (e.g., a pixel defining layer, a passivation layer, etc.) may be disposed in a part (e.g., a dead space) that surrounds the first to third sub-pixels 315, 320 and 325, and the transmitting window 370. In one embodiment, for example, the pixel defining layer 310 may surrounds the first to third sub-pixels 315, 320 and 325, and the transmitting window 370.

In embodiments, an upper electrode 330 of the foldable display panel 11 may be disposed to overlap the first to third sub-pixels 315, 320 and 325 of the pixel area I. In such an embodiment, the upper electrode 330 may not be disposed in the transparent area II.

In an embodiment, as illustrated in FIG. 11B, the foldable display panel 11 may include a substrate 110, a first insulating layer 150, a second insulating layer 190, a third insulating layer 270, a driving transistor 250, a lower electrode 290, a pixel defining layer 310, an emission layer which defines the first sub-pixel 315, an upper electrode 330, a transmitting window 370, and an encapsulation layer 350. Hereinafter, for convenience of description, the emission layer will be labeled with the same reference number used to describe the first sub pixel 315. The driving transistor 250 may include an active layer 130, a gate electrode 170, a source electrode 210, and a drain electrode 230.

In an embodiment, the driving transistor 250, the lower electrode 290, the emission layer 315, and the upper electrode 330 may be disposed in the pixel area I. The transmitting window 370 may be disposed in the transmitting area II. In one embodiment, for example, an image may be displayed on the pixel area I, and an image of a target that is disposed at a position opposite to the foldable display panel 11 may pass through the transmitting area II.

In an embodiment, the display areas other than the transparent display area TDA may have a configuration substantially identical or similar to that of the pixel area I.

The substrate 110 may be formed of a transparent resin substrate having ductility. In one embodiment, for example, the transparent resin substrate that may be used as the substrate 110 may be a polyimide substrate.

The driving transistor 250 may include the active layer 130, the gate electrode 170, the source electrode 210, and the drain electrode 230. In one embodiment, for example, the active layer 130 may be disposed on the substrate 110 and include an oxide semiconductor, an inorganic semiconductor (e.g., an amorphous silicon or a poly silicon), or an organic semiconductor.

The first insulating layer 150 may be disposed on the active layer 130. The first insulating layer 150 may cover the active layer 130 in the pixel area I and extend to the transmitting area II. In such an embodiment, the first insulating layer 150 may be disposed on an entire surface of the substrate 110 in the pixel area I and the transmitting area II. The first insulating layer 150 may include a silicon compound or metal oxide, for example.

The gate electrode 170 may be disposed on a portion of the first insulating layer 150 under which the active layer 130 is disposed. The gate electrode 170 may include or be formed of metal, an alloy, a metal nitride, a conductive metal oxide or a transparent conductive material, for example.

The second insulating layer 190 may be disposed on the gate electrode 170. The second insulating layer 190 may cover the gate electrode 170 in the pixel area I and extend to the transmitting area II. The second insulating layer 190 may include a silicon compound or a metal oxide, for example.

The source electrode 210 and the drain electrode 230 may be disposed on the second insulating layer 190. The source electrode 210 and the drain electrode 230 may be respectively connected to a first side and a second side of the active layer 130 by being disposed through the first insulating layer 150 and the second insulating layer 190. The source electrode 210 and the drain electrode 230 may be respectively connected to the first side and the second side of the active layer 130 via openings defined through the first insulating layer 150 and the second insulating layer 190. Each of the source electrode 210 and the drain electrode 230 may include a metal, an alloy, a metal nitride, a conductive metal oxide or a transparent conductive material, for example.

The third insulating layer 270 may be disposed on the source electrode 210 and the drain electrode 230. The third insulating layer 270 may be disposed on an entire surface of the second insulating layer 190 in the pixel area I and the transmitting area II. The third insulating layer 270 may include a silicon compound or a metal oxide, for example.

The lower electrode 290 may be disposed on the third insulating layer 270. The lower electrode 290 may be connected with the source electrode 210 through the third insulating layer 270. The lower electrode 290 may include a metal, an alloy, a metal nitride, a conductive metal oxide or a transparent conductive material, for example.

The pixel defining layer 310 may be disposed on the third insulating layer 270 while exposing a portion of the lower electrode 290. The pixel defining layer 310 may include or be formed of an organic material or an inorganic material. In the pixel area I, a first opening may be defined in the pixel defining layer 310 to expose a portion of the lower electrode 290. The emission layer 315 may be disposed on the exposed portion of the lower electrode 290. In the transmitting area II, a second opening may be defined in the pixel defining layer 310 to expose a portion of the third insulating layer 270. The second opening may correspond to the transmitting window 370.

The emission layer 315 may be disposed on the exposed portion of the lower electrode 290. The emission layer 315 may include or be formed of at least one of light emitting materials capable of emitting different colors (e.g., a red color, a green color, and a blue color) of light to correspond to colors of the first to third sub-pixels 315, 320 and 325 illustrated in FIG. 11A.

The upper electrode 330 may be disposed on the pixel defining layer 310 and the emission layer 315 in the pixel area I. The upper electrode 330 may not be disposed in the transmitting area II. The upper electrode 330 may be shared by the first to third sub-pixels 315, 320 and 325. The upper electrode 330 may include or be formed of a metal, an alloy, a metal nitride, a conductive metal oxide or a transparent conductive material, for example.

The encapsulation layer 350 may be disposed on the upper electrode 330, the pixel defining layer 310, and the transmitting window 370. The encapsulation layer 350 may include or be formed of a transparent inorganic material or a flexible plastic. In one embodiment, for example, the encapsulation layer 350 may include a transparent resin substrate having ductility. The encapsulation layer 350 may have a structure in which at least one or more organic layers and at least one or more inorganic layers are alternately stacked one on another.

Figure 12A:
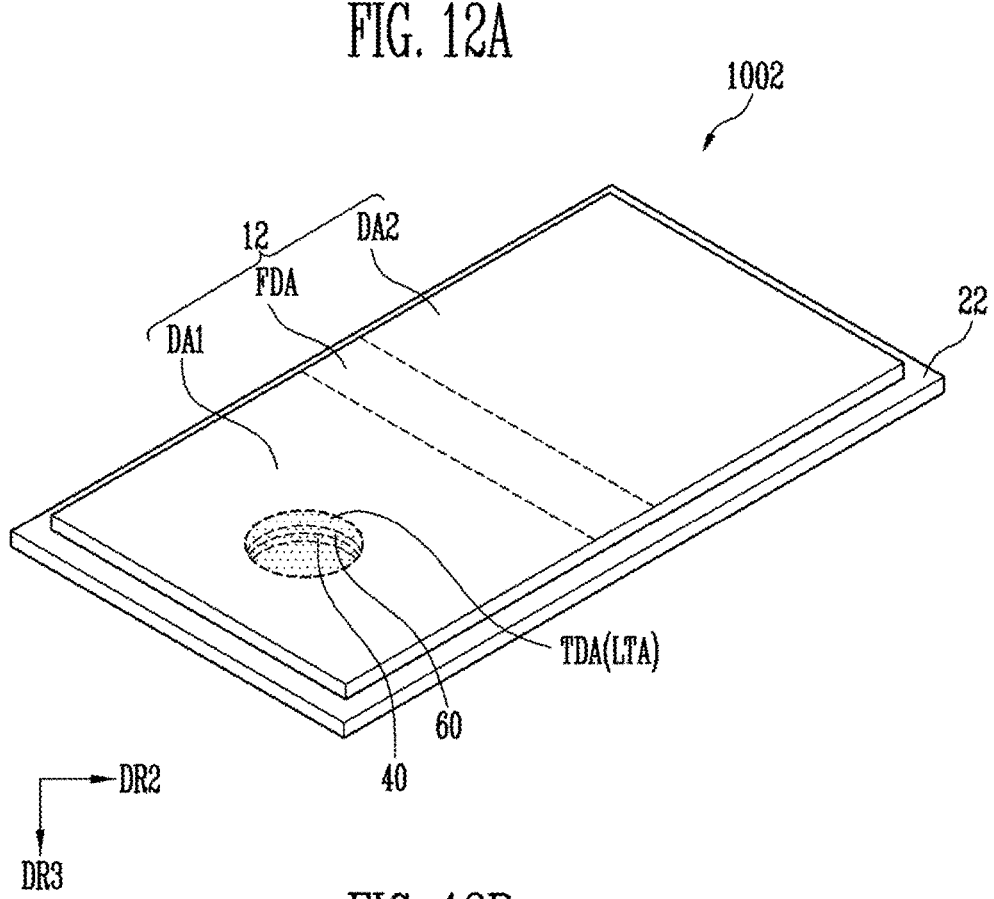
FIG. 12A is a perspective view illustrating an exemplary embodiment of the foldable display device in an unfolded state.
Figure 12B:
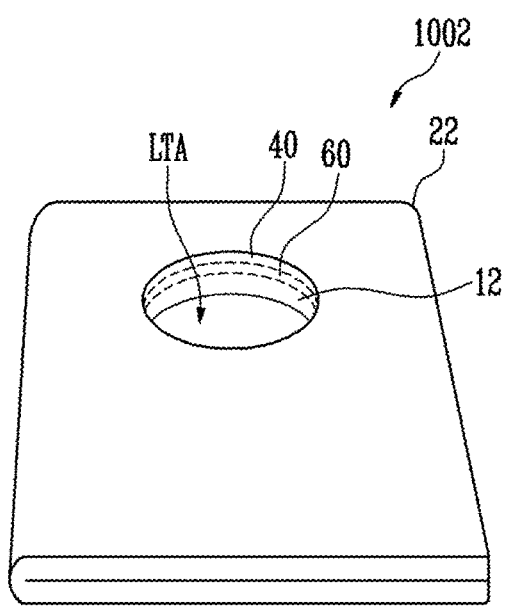
FIG. 12B is a perspective view illustrating the foldable display device of FIG. 12A in a folded state.

FIG. 12A is a perspective view illustrating an exemplary embodiment of the foldable display device in an unfolded state. FIG. 12B is a perspective view illustrating the foldable display device of FIG. 12A in a folded state.

The foldable display device 1002 of FIGS. 12A and 12B may have a configuration substantially identical or similar to the foldable display device of FIG. 8 except for the position and the shape of the light transmitting area. In FIGS. 12A and 12B, like reference numerals will be used to designate the same or like elements as those described with reference to FIGS. 8 to 9B, and any repetitive detailed description of the same or like elements will be omitted.

Referring to FIGS. 8, 12A, and 12B, an embodiment of the foldable display device 1002 may include a foldable display panel 12 and a support structure 22.

A light transmitting area LTA may be disposed in a first support of the support structure 22 that corresponds to a first display area DA1. In an embodiment, the light transmitting area LTA may have a circular or elliptical shape.

The light transmitting area LTA may include an electrochromic window 60 and an input sensor 40.

The foldable display panel 12 may include a transparent display area TDA including a transmitting window in a portion of the first display area DA1 that corresponds to the light transmitting area LTA. Except the transparent display area TDA, the other display area is an opaque display area with no transmitting window.

In such an embodiment, as illustrated in FIG. 12A, when the foldable display device 1002 is unfolded, the electrochromic window 60 may be changed to be opaque such that a deviation in luminance or image between the transparent display area TDA and an area surrounding the transparent display area TDA may not be discerned by the user.

In such an embodiment, when the foldable display device 1002 is folded, the electrochromic window 60 may be changed to be transparent, and an image displayed on a portion of a second display area DA2 may be visible to the user through the light transmitting area LTA. When the foldable display device 1002 is folded, the transparent display area TDA may not emit light, and the transparent display area TDA may not display an image. In such an embodiment, when the foldable display device 1002 is folded, the input sensor 40 disposed in the light transmitting area LTA may be activated such that an image or an application may be controlled when the foldable display device 1002 is in the folded state.

In an embodiment, when the foldable display device 1002 is folded, the electrochromic window 60 may be changed to be transparent, and an image of the transparent display area TDA may be visible to the user. In such an embodiment, the other display area (e.g., the second display area DA2) that overlaps the transparent display area TDA is turned off, the image of the transparent display area TDA may be clearly visible to the user.

Figure 13A:
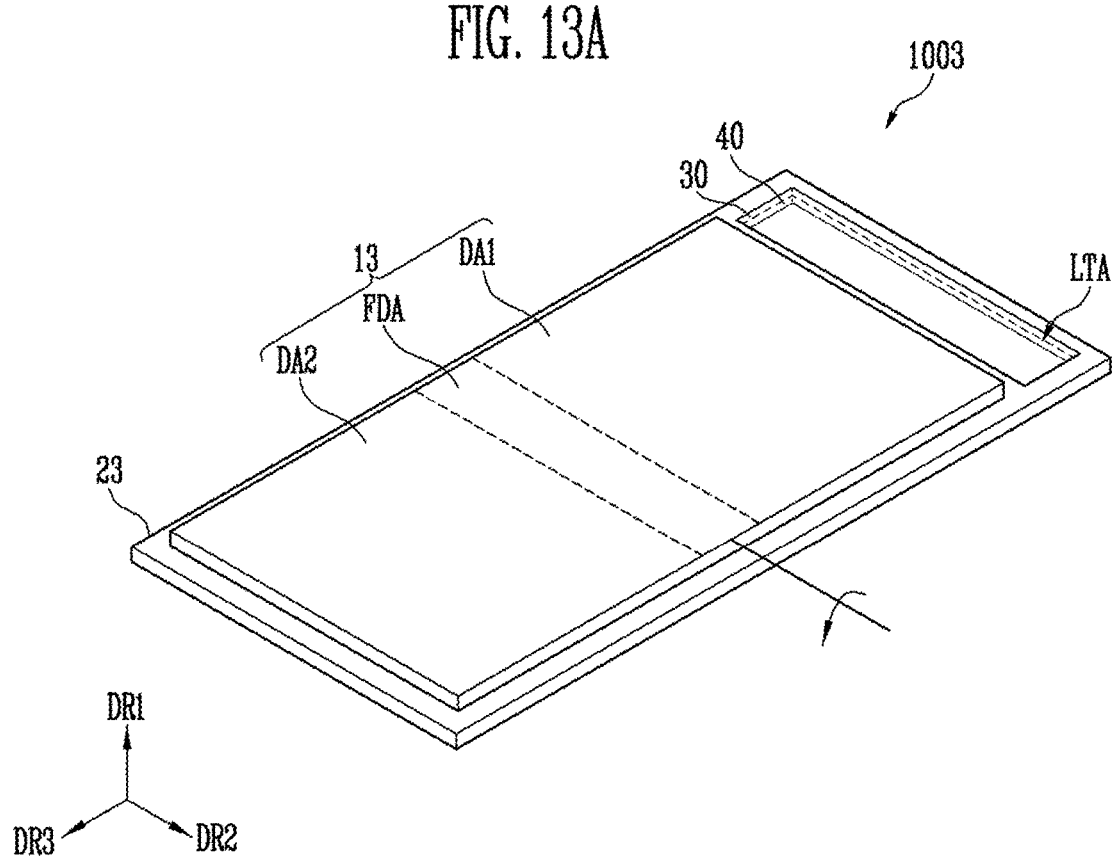
FIG. 13A is a perspective view illustrating an alternative exemplary embodiment of the foldable display device in an unfolded state.
Figure 13B:
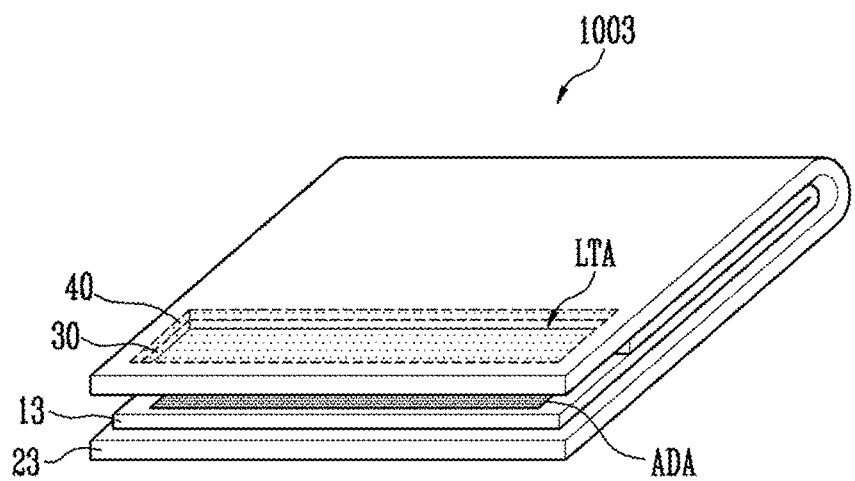
FIG. 13B is a perspective view illustrating the foldable display device of FIG. 13A in a folded state.

FIG. 13A is a perspective view illustrating an alternative exemplary embodiment of the foldable display device in an unfolded state. FIG. 13B is a perspective view illustrating the foldable display device of FIG. 13A in a folded state.

The foldable display device 1003 of FIGS. 13A and 13B may have a configuration substantially identical or similar to the foldable display device of FIG. 1 except for the position of the light transmitting area. In FIGS. 13A and 13B, like reference numerals will be used to designate the same or like elements as those described with reference to FIGS. 1 to 3C, and any repetitive detailed description of the same or like elements will be omitted.

Referring to FIGS. 1, 13A, and 13B, an embodiment of the foldable display device 1003 may include a foldable display panel 13 and a support structure 23.

In an embodiment of the foldable display device 1003 illustrated in FIGS. 13A and 13B, a folding axis is parallel with the second direction DR2, and the light transmitting area LTA and the opening OP may be spaced apart from the folding axis in the third direction DR3. In one embodiment, for example, the foldable display device 1000 may be applied to an electronic device which is foldable in an up-down direction.

The light transmitting area LTA may be disposed in a first support of the support structure 23 that corresponds to a first display area DAL In an embodiment, the light transmitting area LTA may have a rectangular shape.

The light transmitting area LTA may include a transparent insulating layer 30 and an input sensor 40.

The foldable display panel 13 may be disposed on the support structure 23, and may not overlap the light transmitting area LTA when the foldable display panel 13 is unfolded.

In an embodiment, as illustrated in FIG. 13B, when the foldable display device 1003 is folded, an image displayed on a portion of the second display area DA2 (e.g., an image of an auxiliary display area ADA) may be visible to the user through the light transmitting area LTA. In such an embodiment, the input sensor 40 disposed in the light transmitting area LTA may be activated in a way such that an image or an application may be controlled when the foldable display device 1003 is in the folded state.

In such an embodiment, the position, the shape and the structure of the light transmitting area LTA are not limited to those described above, but may be variously modified.

Figure 14A:
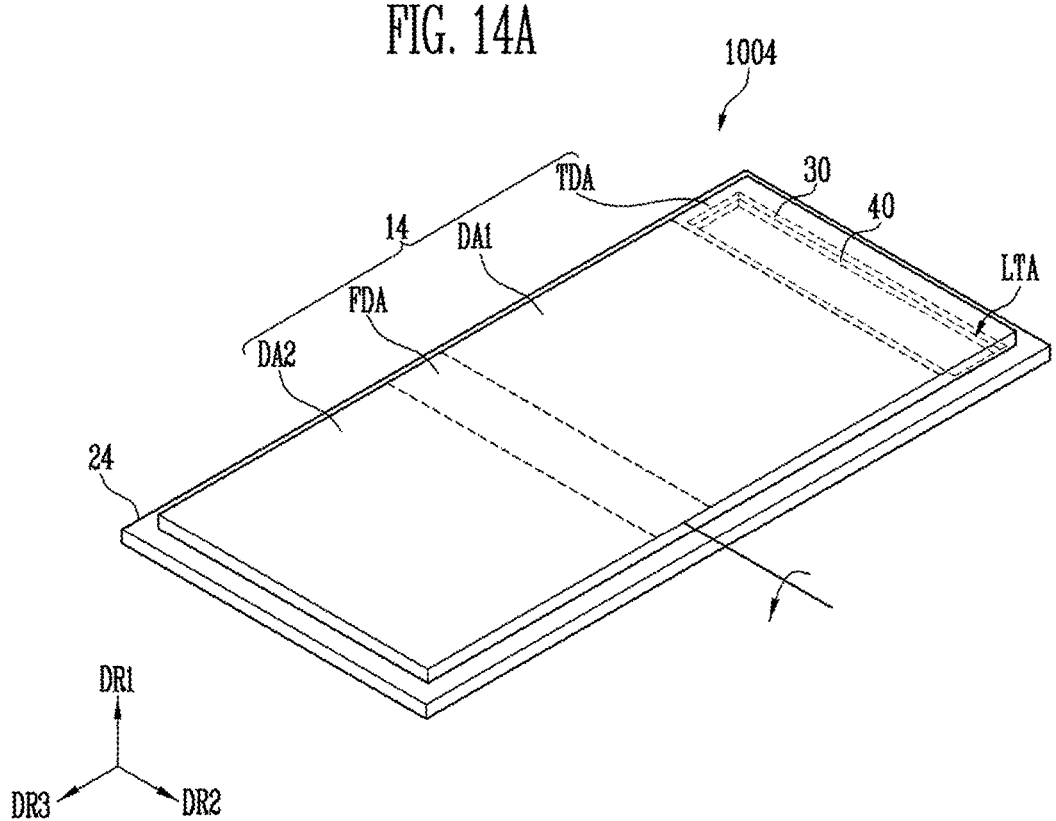
FIG. 14A is a perspective view illustrating another alternative exemplary embodiment of the foldable display device in an unfolded state.
Figure 14B:
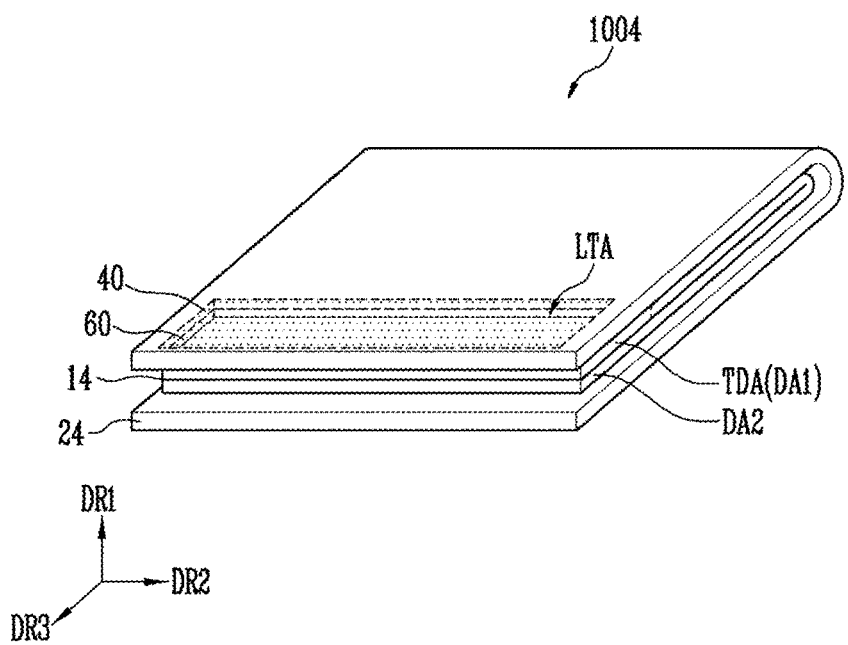
FIG. 14B is a perspective view illustrating the foldable display device of FIG. 14A in a folded state.

FIG. 14A is a perspective view illustrating another alternative exemplary embodiment of the foldable display device in an unfolded state. FIG. 14B is a perspective view illustrating the foldable display device of FIG. 14A in a folded state.

The foldable display device 1004 of FIGS. 14A and 14B may have a configuration substantially identical or similar to the foldable display device of FIG. 8 except for the position of the light transmitting area.

Referring to FIGS. 8, 14A, and 14B, an embodiment of the foldable display device 1004 may include a foldable display panel 14 and a support structure 24.

The foldable display device 1004 of FIGS. 14A and 14B may be applied to an electronic device which is foldable in an up-down direction, in the same manner as that of the foldable display device 1003 of FIGS. 13A and 13B.

The foldable display panel 14 may include a transparent display area TDA which overlaps the light transmitting area LTA of the support structure 24. In one embodiment, for example, the transparent display area TDA may be included in a portion of a first display area DA1. Therefore, the first display area DA1 and a second display area DA2 may have substantially a same surface area as each other.

The light transmitting area LTA may include an electrochromic window 60 and an input sensor 40.

In such an embodiment, as illustrated in FIG. 14A, when the foldable display device 1004 is unfolded, the electrochromic window 60 may be changed to be opaque.

In such an embodiment, as illustrated in FIG. 14B, when the foldable display device 1004 is folded, the electrochromic window 60 may be changed to be transparent.

In an embodiment, an image displayed on a portion of the second display area DA2 that overlaps the transparent display area TDA may be visible to the user through the transparent electrochromic window 60 and the transparent display area TDA.

In an embodiment, when the foldable display device 1004 is folded, the image of the second display area DA2 is turned off (i.e., black is expressed), and an image may be displayed on the transparent display area TDA. In such an embodiment, the image of the transparent display area TDA may be visible to the user through the transparent electrochromic window 60.

In an embodiment of the invention, as described above, a foldable display device may be implemented in an in-folding manner. A light transmitting area including an input sensor may be defined in a portion of a support structure. Therefore, in such an embodiment, an additional display panel conventionally provided on a second surface of the support structure to allow a user to check displayed information when the foldable display device is in a folded state may be omitted. Consequently, the production cost, the thickness, the power consumption, etc. of the foldable display device may be effectively prevented from increasing by omitting such an additional display panel.

In an embodiment of the invention, when the foldable display device is in the folded state, an image and/or an application may be controlled by the input sensor disposed in the light transmitting area of the support structure, such that use convenience of the in-folding type foldable display device may be enhanced.

The invention should not be construed as being limited to the exemplary embodiments set forth herein. Rather, these exemplary embodiments are provided so that this disclosure will be thorough and complete and will fully convey the concept of the invention to those skilled in the art.

While the invention has been particularly shown and described with reference to exemplary embodiments thereof, it will be understood by those of ordinary skill in the art that various changes in form and details may be made therein without departing from the spirit or scope of the invention as defined by the following claims.

What is claimed is:

1. A foldable display device comprising: a support structure including a hinge, a plurality of supports disposed on opposite sides of the hinge and physically coupled to the hinge, an electrochromic window disposed in a light transmitting area, wherein the light transmitting area is defined in a portion of the supports; a foldable display panel disposed on a first surface of the support structure, and including a foldable display area corresponding to the hinge, and a plurality of display areas disposed on opposite sides of the foldable display area; and a first input sensor disposed in the light transmitting area of the support structure at a position spaced apart from the foldable display panel, wherein the foldable display panel further comprises a transparent display area including a plurality of pixels, and wherein the pixels of the transparent display area overlap the electrochromic window.

2. The foldable display device according to claim 1, wherein the light transmitting area corresponds to an opening defined in the support structure, and wherein a transparent insulating layer is disposed in the opening of the support structure.

3. The foldable display device according to claim 2, wherein the first input sensor is disposed on the transparent insulating layer, and
wherein the transparent insulating layer is disposed between the first input sensor and the foldable display panel when the foldable display panel is folded.

4. The foldable display device according to claim 3, wherein, when the foldable display panel is unfolded, the foldable display panel does not overlap the light transmitting area and the first input sensor.

5. The foldable display device according to claim 3, wherein, when the foldable display panel is folded, a portion of the display areas of the foldable display panel overlaps the light transmitting area.

6. The foldable display device according to claim 3, further comprising:
a transparent protective layer disposed to cover the first input sensor.

7. The foldable display device according to claim 3, wherein at least a portion of a sidewall of the opening of the support structure includes an inclined surface which is inclined with respect to a first direction perpendicular to the first surface of the support structure and to a second surface of the support structure facing the first surface.

8. The foldable display device according to claim 7, wherein a first width of the opening, which is defined on a plane in an extension of the first surface of the support structure, is greater than a second width of the opening, which is defined on a plane in an extension of the second surface of the support structure.

9. The foldable display device according to claim 1, wherein the first input sensor comprises at least one of a touch sensor and a pressure sensor, each of which includes a transparent conductive pattern.

10. The foldable display device according to claim 1, wherein, when the foldable display panel is folded with an angle less than a predetermined reference angle, the first input sensor is activated, and
wherein, when the foldable display panel is unfolded with an angle greater than or equal to the reference angle, the first input sensor is inactivated.

11. The foldable display device according to claim 1, wherein the support structure is disposed opposite to a display surface of the foldable display panel, and
wherein the foldable display panel further comprises:
a second input sensor disposed on the display surface.

12. The foldable display device according to claim 1, wherein the light transmitting area corresponds to an opening of the support structure, and wherein a transparency of the electrochromic window varies based on an amount of current applied to the electrochromic window.

13. The foldable display device according to claim 12, wherein the electrochromic window comprises:
a first transparent insulating layer disposed on a plane in an extension of the first surface of the support structure;
a first transparent electrode layer disposed on the first transparent insulating layer;
a polymer dispersed liquid crystal disposed on the first transparent electrode layer;
a second transparent electrode layer disposed on the polymer dispersed liquid crystal; and
a second transparent insulating layer disposed on the second transparent electrode layer.

14. The foldable display device according to claim 13, wherein the first input sensor is disposed on the second transparent insulating layer.

15. The foldable display device according to claim 14, wherein the first input sensor comprises at least one of a touch sensor and a pressure sensor, each of which includes a transparent conductive pattern.

16. A foldable display device comprising: a support structure including a hinge, a plurality of supports disposed on opposite sides of the hinge and physically coupled to the hinge, and an electrochromic window disposed in a light transmitting area defined in a portion of the supports: a foldable display panel disposed on a first surface of the support structure, and including a foldable display area corresponding to the hinge, and a plurality of display areas disposed on opposite sides of the foldable display area; and a first input sensor disposed in the light transmitting area of the support structure at a position spaced apart from the foldable display panel, wherein the light transmitting area corresponds to an opening defined in the support structure, wherein, when the foldable display panel is folded with an angle less than a predetermined reference angle, the electrochromic window is changed to be transparent, and wherein, when the foldable display panel is unfolded with an angle greater than or equal to the reference angle, the electrochromic window is changed to be opaque.

17. A foldable display device comprising: a support structure including a hinge, a plurality of supports disposed on opposite sides of the hinge and physically coupled to the hinge, wherein an opening is defined in a portion of the supports; a transparent insulating layer disposed in the opening of the support structure; a foldable display panel disposed on a first surface of the support structure, wherein the foldable display panel includes a foldable display area corresponding to the hinge, and a plurality of display areas disposed on opposite sides of the foldable display area; a transparent conductive pattern disposed on a surface of the transparent insulating layer, which is adjacent to a second surface of the support structure opposite to the first surface of the support structure; and an electrochromic window disposed between the transparent insulating layer and the transparent conductive pattern, wherein the foldable display panel further comprises a transparent display area including a plurality of pixels, and the pixels of the transparent display area overlap the electrochromic window.

18. The foldable display device according to claim 17,
wherein, when the foldable display panel is unfolded, the foldable display panel does not overlap the opening of the support structure, and
wherein, when the foldable display panel is folded, a portion of the display areas of the foldable display panel overlaps the opening of the support structure.

* * * * *